(12) United States Patent
Takahashi et al.

(10) Patent No.: US 12,706,330 B2
(45) Date of Patent: Aug. 11, 2026

(54) POWER STORAGE DEVICE AND ELECTRONIC DEVICE

(71) Applicant: SEMICONDUCTOR ENERGY LABORATORY CO., LTD., Atsugi (JP)

(72) Inventors: Kei Takahashi, Isehara (JP); Kazuki Tanemura, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 989 days.

(21) Appl. No.: 17/906,443

(22) PCT Filed: Mar. 17, 2021

(86) PCT No.: PCT/IB2021/052200

§ 371 (c)(1),
(2) Date: Sep. 15, 2022

(87) PCT Pub. No.: WO2021/191736

PCT Pub. Date: Sep. 30, 2021

(65) Prior Publication Data

US 2023/0144022 A1 May 11, 2023

(30) Foreign Application Priority Data

Mar. 27, 2020 (JP) ................................ 2020-057843

(51) Int. Cl.
*H01M 10/46* (2006.01)
*H01M 10/42* (2006.01)
(Continued)

(52) U.S. Cl.
CPC ....... *H01M 10/46* (2013.01); *H01M 10/4264* (2013.01); *H02J 7/70* (2026.01)

(58) Field of Classification Search
CPC ........ H01M 4/66; H01M 10/425; H01M 4/62; H02J 7/02
See application file for complete search history.

(56) References Cited

U.S. PATENT DOCUMENTS 7,033,001 B2 4/2006 Fujii et al.
7,478,558 B2 1/2009 Fujii et al.
(Continued)

FOREIGN PATENT DOCUMENTS

CN 105655554 A 6/2016
CN 106575794 A 4/2017
(Continued)

OTHER PUBLICATIONS

International Search Report (Application No. PCT/IB2021/052200) Dated Jun. 29, 2021.
(Continued)

*Primary Examiner* — Julian D Huffman
*Assistant Examiner* — Sadia Kousar
(74) *Attorney, Agent, or Firm* — Fish & Richardson P.C.

(57) ABSTRACT

A power storage device or the like with low power consumption is provided. Alternatively, a power storage device or the like with high integration is provided. A first battery cell includes a first electrode over a first substrate, a positive electrode active material layer over the first electrode, an electrolyte layer over the positive electrode active material layer, a negative electrode active material layer over the electrolyte layer, and a second electrode over the negative electrode active material layer. The comparison circuit includes a first input terminal, a second input terminal, an output terminal, and a first transistor. The first transistor includes an oxide semiconductor over the first substrate, a first insulator over the oxide semiconductor, and a gate electrode over the first insulator. The first electrode is
(Continued)

electrically connected to the gate of the first transistor and the first input terminal. The comparison circuit has a function of outputting a first signal in response to a result of comparison between a potential of the first electrode and a desired reference potential from the output terminal to the control circuit. The control circuit has a function of controlling charging of the first battery cell in accordance with the first signal.

16 Claims, 19 Drawing Sheets

(51) Int. Cl.
*H02J 7/00* (2026.01)
*H02J 7/70* (2026.01)

(56) References Cited

U.S. PATENT DOCUMENTS

| | | | |
|---|---|---|---|
| 8,471,526 B2 | 6/2013 | Kanno | |
| 8,749,204 B2 | 6/2014 | Majima et al. | |
| 10,250,247 B2 | 4/2019 | Kato et al. | |
| 10,693,448 B2 | 6/2020 | Kato et al. | |
| 10,741,834 B2 | 8/2020 | Zhang et al. | |
| 11,217,865 B2 | 1/2022 | Yamazaki | |
| 2002/0110736 A1 | 8/2002 | Kweon et al. | |
| 2003/0104279 A1 | 6/2003 | Miyazaki et al. | |
| 2004/0142241 A1 | 7/2004 | Nagayama | |
| 2006/0263690 A1 | 11/2006 | Suhara et al. | |
| 2007/0117014 A1 | 5/2007 | Saito et al. | |
| 2008/0241693 A1 | 10/2008 | Fukuchi et al. | |
| 2009/0087362 A1 | 4/2009 | Sun et al. | |
| 2009/0104532 A1 | 4/2009 | Hosoya | |
| 2010/0086854 A1 | 4/2010 | Kumar et al. | |
| 2010/0247986 A1 | 9/2010 | Toyama et al. | |
| 2011/0267726 A1 | 11/2011 | Ikeuchi et al. | |
| 2013/0052534 A1 | 2/2013 | Fujiki et al. | |
| 2013/0323596 A1 | 12/2013 | Morita et al. | |
| 2014/0212759 A1 | 7/2014 | Blangero et al. | |
| 2015/0008364 A1 | 1/2015 | Endo | |
| 2016/0006032 A1 | 1/2016 | Paulsen et al. | |
| 2016/0013140 A1* | 1/2016 | Tsuboi | H10W 42/00 429/7 |
| 2016/0013478 A1 | 1/2016 | Satow et al. | |
| 2016/0156032 A1 | 6/2016 | Lee et al. | |
| 2016/0268601 A1 | 9/2016 | Paulsen et al. | |
| 2016/0276659 A1 | 9/2016 | Choi et al. | |
| 2017/0222208 A1* | 8/2017 | Yamazaki | H01G 11/06 |
| 2017/0230041 A1* | 8/2017 | Kato | H03K 5/2481 |
| 2018/0013130 A1 | 1/2018 | Ochiai et al. | |
| 2018/0145317 A1 | 5/2018 | Momma et al. | |
| 2018/0145368 A1 | 5/2018 | Ochiai et al. | |
| 2019/0245199 A1 | 8/2019 | Zeng et al. | |
| 2020/0176770 A1 | 6/2020 | Takahashi et al. | |
| 2020/0220173 A1 | 7/2020 | Jo et al. | |
| 2021/0083281 A1 | 3/2021 | Mikami et al. | |
| 2021/0313571 A1 | 10/2021 | Momma et al. | |
| 2022/0131146 A1 | 4/2022 | Saito et al. | |
| 2022/0359870 A1 | 11/2022 | Mikami et al. | |
| 2025/0105282 A1 | 3/2025 | Liu et al. | |

FOREIGN PATENT DOCUMENTS

| | | |
|---|---|---|
| CN | 113140726 A | 7/2021 |
| JP | 2000-203842 A | 7/2000 |
| JP | 2002-216760 A | 8/2002 |
| JP | 2004-047928 A | 2/2004 |
| JP | 2010-066161 A | 3/2010 |
| JP | 2010-080407 A | 4/2010 |
| JP | 2010-220389 A | 9/2010 |
| JP | 2015-099722 A | 5/2015 |
| JP | 2017-192124 A | 10/2017 |
| WO | WO-2016/020795 | 2/2016 |

OTHER PUBLICATIONS

Written Opinion (Application No. PCT/IB2021/052200) Dated Jun. 29, 2021.

Sharma.A et al., "Integration of Pb(Zr0.52Ti0.48)O3 epilayers with Si by domain epitaxy", Appl. Phys. Lett. (Applied Physics Letters) , Mar. 13, 2000, vol. 76, No. 11, pp. 1458-1460.

Bao.D et al., "Ferroelectric properties of sandwich structured (Bi, La)4Ti3O12/Pb(Zr, Ti)O3/ (Bi, La)4Ti3O12 thin films on Pt/Ti/SiO2/Si substrates", J. Phys. D: Appl. Phys. (Journal of Physics D: Applied Physics), Jan. 22, 2002, vol. 35, No. 3, pp. L1-L5.

Wu.W et al., "Low-temperature growth and characterization of epitaxial La0.5Sr0.5CoO3/Pb(Zr0.52Ti0.48)O3/La0.5Sr0.5CoO3 capacitors on SrTiO3/TiN buffered Si(001) substrates", J. Phys. D: Appl. Phys. (Journal of Physics D: Applied Physics), 2001, vol. 34, No. 11, pp. 1587-1591.

Wang.C et al., "Epitaxial growth and resistive switching properties of BaTiO3 on (001) Si by RF sputtering", J. Phys. D: Appl. Phys. (Journal of Physics D: Applied Physics), Nov. 25, 2008, vol. 41, No. 24, pp. 245301-1-245301-4.

Singamaneni.S et al., "Ferroelectric and ferromagnetic properties in BaTiO3 thin films on Si (100)", J. Appl. Phys. (Journal of Applied Physics) , Sep. 4, 2014, vol. 116, pp. 094103-1-094103-5.

Lee.E et al., "Preparation and properties of ferroelectric BaTiO3 thin films produced by the polymeric precursor method", J. Mater. Sci. Lett.(Journal of Materials Science Letters), Aug. 1, 2000, vol. 19, pp. 1457-1459.

Kaleli.B et al., "Analysis of thin-film PZT/LNO stacks on an encapsulated TiN electrode", Microelectronic Engineering, May 1, 2014, vol. 119, pp. 16-19, Elsevier.

Zhang.J et al., "Trace doping of multiple elements enables stable battery cycling of LiCoO2 at 4.6 V", Nature Energy, Jun. 17, 2019, vol. 4, pp. 594-603.

Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.

Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.

Okumura.T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.

Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.

Wang.Z et al., "EELS analysis of cation valence states and oxygen vacancies in magnetic oxides", Micron, Oct. 1, 2000, vol. 31, No. 5, pp. 571-580, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.

Chen.Z et al., "Staging Phase Transitions in LixCoO2", J. Electrochem. Soc. (Journal of the Electrochemical Society), Oct. 29, 2002, vol. 149, No. 12, pp. A1604-A1609.

Ohzuku. T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Zou.M et al., "Synthesis and Electrochemical Performance of High Voltage Cycling LiM0.05Co0.95O2 as Cathode Material for Lithium Rechargeable Cells", Electrochemical and Solid-State Letters, Apr. 26, 2004, vol. 7, No. 7, pp. A176-A179.

Kim. Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.

Liu.A et al., "Synthesis of Mg and Mn Doped LiCoO2 and Effects on High Voltage Cycling", J. Electrochem. Soc. (Journal of the

(56) References Cited

OTHER PUBLICATIONS

Electrochemical Society), Jun. 2, 2017, vol. 164, No. 7, pp. A1655-A1664.
Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.
Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.
Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.
Taguchi.N et al., "Characterization of MgO-coated-LiCoO2 particles by analytical transmission electron microscopy", Journal of Power Sources, Aug. 10, 2016, vol. 328, pp. 161-166, Elsevier.
Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.
Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.
Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.
Shao-horn.Y et al., "Probing Lithium and Vacancy Ordering in 03 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.
Zhang.S et al., "Surface engineering of LiCoO2 by a multifunctional nanoshell for stable 4.6V electrochemical performance", Energy Storage Materials, Feb. 21, 2023, vol. 57, pp. 289-298.
Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.

* cited by examiner

200

103

206

A

A'

203

205

581
574
580
524
522
520
516
514
599
542b
543b
530c
530b
530a
530
540b
560
560a
560b
550
503b
503a
503
500
610
543a
542a
540a
544
200
206
205
204
203
101
103

581
574
580
524
522
520
516
514
580b
599
500
542b
550
530
560
503
542a
200
206
205
204
203
101
103

581
574
580
524
522
520
516
514
512
350
326
324
322
320
300
599
314b
313
315
316
314a
328
330
500
610
611
610b
600
200
660c
660b
660a
660
206
205
204
203
101
103

103
203
205

103
206
203
213
215

TS

Vt
SH5
114
VT=Tm1
113
OUT51
SH5
114
VT=Tm2
113
OUT52
SH5
114
VT=Tm3
113
OUT53

MSD

MSD

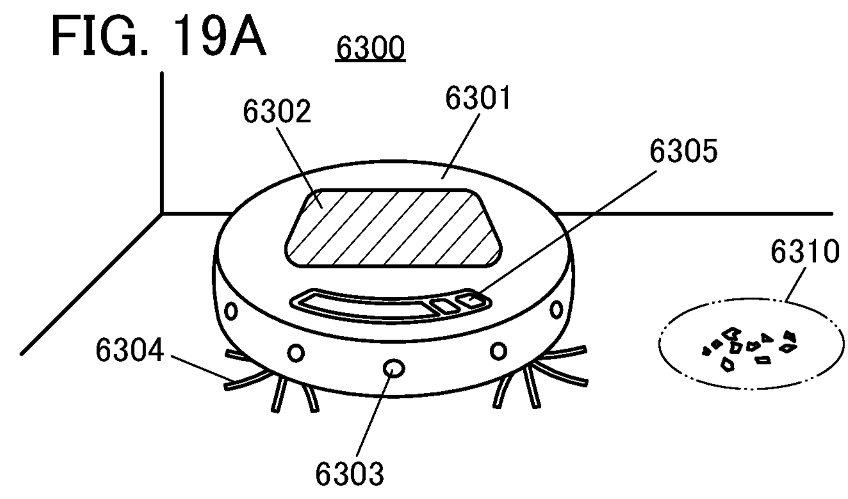
FIG. 19A
6300
6302
6301
6305
6310
6304
6303
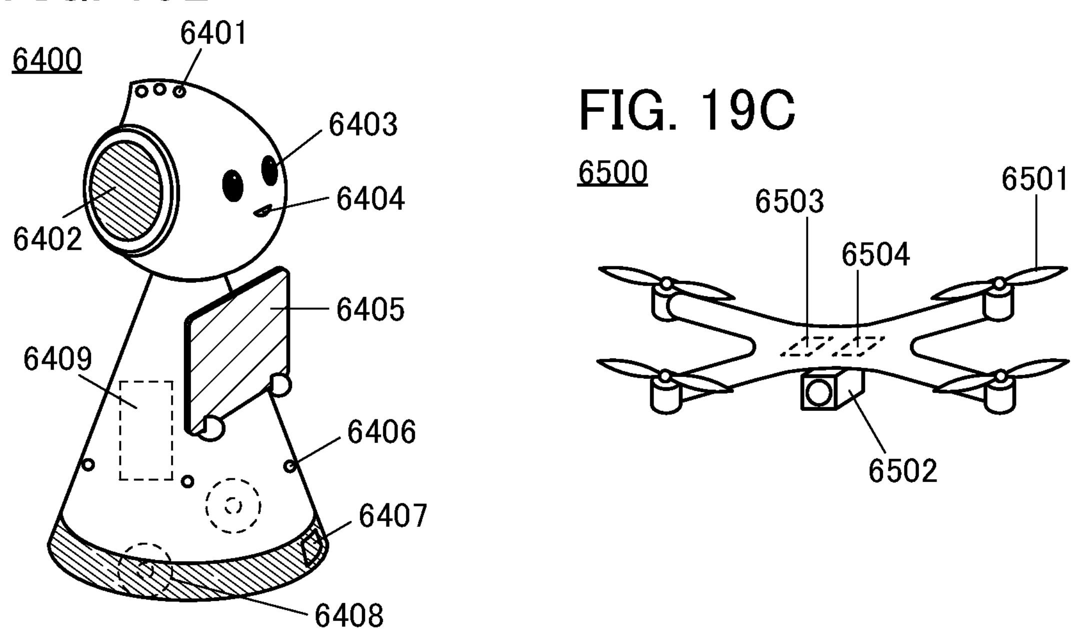
FIG. 19B
6400
6401
6403
6404
6402
6405
6409
6406
6407
6408
FIG. 19C
6500
6503
6501
6504
6502
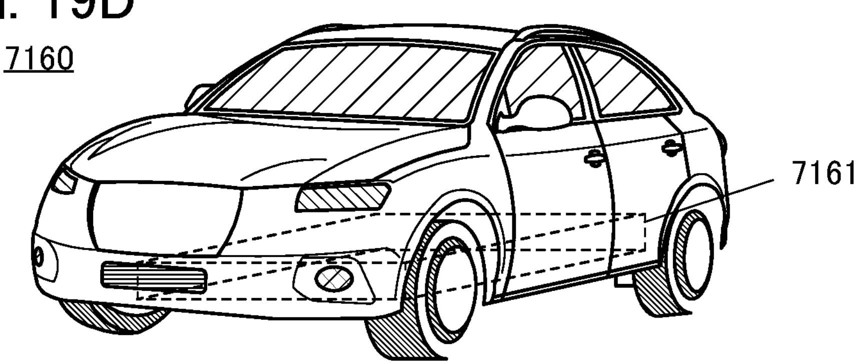
FIG. 19D
7160
7161

POWER STORAGE DEVICE AND ELECTRONIC DEVICE

CROSS REFERENCE TO RELATED APPLICATIONS

This application is a U.S. National Phase Application under 35 U.S.C. § 371 of International Application PCT/IB2021/052200, filed on Mar. 17, 2021, which is incorporated by reference and claims the benefit of a foreign priority application filed in Japan on Mar. 27, 2020, as Application No. 2020-057843.

TECHNICAL FIELD

One embodiment of the present invention relates to a semiconductor device and a method for operating the semiconductor device. One embodiment of the present invention relates to a battery control circuit, a battery protection circuit, a power storage device, and an electronic device.

Note that one embodiment of the present invention is not limited to the above technical field. The technical field of the invention disclosed in this specification and the like relates to an object, a method, or a manufacturing method. Alternatively, one embodiment of the present invention relates to a process, a machine, manufacture, or a composition of matter. Thus, more specifically, examples of the technical field of one embodiment of the present invention disclosed in this specification include a display device, a light-emitting device, a power storage device, an imaging device, a memory device, a driving method thereof, and a manufacturing method thereof.

BACKGROUND ART

Power storage devices (also referred to as batteries or secondary batteries) have been utilized in a wide range of areas from small electronic devices to automobiles. As the application range of batteries expands, the number of applications each with a multi-cell battery stack where a plurality of battery cells are connected in series increases.

The power storage device is provided with a circuit for detecting an abnormality at charging and discharging, such as overdischarging, overcharging, overcurrent, or a short circuit. In such a circuit performing protection and control of a battery, data of a voltage, a current, and the like is obtained in order to detect the abnormality at charging and discharging. Also in such a circuit, stop of charging and discharging, cell balance, and the like are controlled on the basis of the observed data.

Patent Document 1 discloses a protection IC that functions as a battery protection circuit. Patent Document 1 discloses a protection IC that detects abnormality in charging and discharging by comparing, using a plurality of comparators provided inside, a reference voltage and a voltage of a terminal to which a battery is connected.

Patent Document 2 discloses a battery state detector that detects a micro-short circuit of a secondary battery and a battery pack incorporating the detector.

Patent Document 3 discloses a protection semiconductor device for protecting an assembled battery in which secondary battery cells are connected in series.

REFERENCE

Patent Document

[Patent Document 1] United States Patent Application Publication No. 2011-267726
[Patent Document 2] Japanese Published Patent Application No. 2010-66161
[Patent Document 3] Japanese Published Patent Application No. 2010-220389

SUMMARY OF THE INVENTION

Problems to be Solved by the Invention

An object of one embodiment of the present invention is to provide a novel battery control circuit, a novel battery protection circuit, a novel power storage device, a novel semiconductor device, a novel vehicle, a novel electronic device, or the like. Another object of one embodiment of the present invention is to provide a battery control circuit, a battery protection circuit, a power storage device, a semiconductor device, a vehicle, an electronic device, or the like that consumes low power. Another object of one embodiment of the present invention is to provide a battery control circuit, a battery protection circuit, a power storage device, a semiconductor device, a vehicle, an electronic device, or the like that is highly integrated.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to solve at least one of the objects listed above and/or the other objects.

Means for Solving the Problems

One embodiment of the present invention is a power storage device including a first substrate, a first battery cell, a comparison circuit, and a control circuit. The first battery cell includes a first electrode over the first substrate, a positive electrode active material layer over the first electrode, an electrolyte layer over the positive electrode active material layer, a negative electrode active material layer over the electrolyte layer, and a second electrode over the negative electrode active material layer. The comparison circuit includes a first input terminal, a second input terminal, an output terminal, and a first transistor. The first transistor includes an oxide semiconductor over the first substrate, a first insulator over the oxide semiconductor, and a gate electrode over the first insulator. The first electrode is electrically connected to the gate electrode of the first transistor and the first input terminal. The comparison circuit has a function of outputting a first signal in response to a result of comparison between a potential of the first electrode and a desired reference potential from the output terminal to the control circuit. The control circuit has a function of controlling charging of the first battery cell in accordance with the first signal.

In the above structure, it is preferable that the power storage device include a second transistor and a capacitor, one of a source and a drain of the second transistor be electrically connected to the second input terminal, the other of the source and the drain of the second transistor be electrically connected to one electrode of the capacitor, and the second transistor contain an oxide semiconductor.

In the above structure, it is preferable that the output terminal be electrically connected to a source or a drain of the first transistor.

In the above structure, it is preferable that the power storage device further include a second transistor containing an oxide semiconductor, a third transistor containing an oxide semiconductor, and a capacitor, one of a source and a drain of the second transistor be electrically connected to the second input terminal and a gate of the third transistor, the other of the source and the drain of the second transistor be electrically connected to one electrode of the capacitor, and the output terminal be electrically connected to a source or a drain of the third transistor.

In the above structure, it is preferable that the power storage device further include a second insulator over the gate electrode of the first transistor, and a third electrode over the second insulator, the first electrode be positioned over the second insulator, the first electrode and the third electrode each include a titanium compound, and the third electrode be electrically connected to a source or a drain of the first transistor.

In the above structure, it is preferable that the first transistor include a source electrode and a drain electrode, and the first electrode, the source electrode of the first transistor, and the drain electrode of the first transistor each include a titanium compound.

In the above structure, it is preferable that the first electrode and the gate electrode of the first transistor each include a titanium compound.

In the above structure, it is preferable that the power storage device further include a second battery cell, a converter circuit, a clock generation circuit, a booster circuit, and a voltage retention circuit, the first transistor include a back gate, the converter circuit have a function of converting a positive electrode potential of the second battery cell and supplying the potential as a second signal to the clock generation circuit, the clock generation circuit have a function of generating a third signal as a clock signal, with use of the second signal, the booster circuit have a function of generating a first potential with use of the third signal, and the voltage retention circuit have a function of supplying the first potential to the back gate to be retained.

In the above structure, it is preferable that the first substrate be any of a glass substrate, a quartz substrate, a sapphire substrate, a ceramic substrate, a metal substrate, a semiconductor substrate, an SOI substrate, and a plastic substrate.

In the above structure, it is preferable that the first substrate be a semiconductor substrate, the first substrate include silicon, and a transistor with a channel formation region in the first substrate be included.

Another embodiment of the present invention is a power storage device including: a first substrate; a first transistor including an oxide semiconductor over the first substrate, a first insulator over the oxide semiconductor, and a gate electrode over the first insulator; a second insulator over the oxide semiconductor; a first battery cell including a first electrode over the second insulator, a positive electrode active material layer over the first electrode, an electrolyte layer over the positive electrode active material layer, a negative electrode active material layer over the electrolyte layer, and a second electrode over the negative electrode active material layer; and a third electrode over the second insulator, in which the third electrode is electrically connected to a source or a drain of the first transistor.

In the above structure, it is preferable that the first electrode and the third electrode include a titanium compound.

In the above structure, the first transistor preferably includes an oxide semiconductor in a channel formation region.

In the above structure, it is preferable that a fourth electrode over the third electrode and a third insulator sandwiched between the third electrode and the fourth electrode be further included, and that the first electrode and the fourth electrode each include a titanium compound.

In the above structure, it is preferable that a fourth electrode over the third electrode and a piezoelectric layer sandwiched between the third electrode and the fourth electrode be further included, and that the first electrode and the fourth electrode each include a titanium compound.

Another embodiment of the present invention is a power storage device including: a first substrate; a first transistor including a source electrode and a drain electrode over the first substrate, an oxide semiconductor over the source electrode and the drain electrode, a first insulator over the oxide semiconductor, and a gate electrode over the first insulator; and a first battery cell including a first electrode over the first substrate, a positive electrode active material layer over the first electrode, an electrolyte layer over the positive electrode active material layer, a negative electrode active material layer over the electrolyte layer, and a second electrode over the negative electrode active material layer, in which the source electrode, the drain electrode, and the first electrode each include a titanium compound.

Another embodiment of the present invention is an electronic device including a first substrate, a first battery cell, a comparison circuit, a control circuit, and a piezoelectric element. The first battery cell includes a first electrode over the first substrate, a positive electrode active material layer over the first electrode, an electrolyte layer over the positive electrode active material layer, a negative electrode active material layer over the electrolyte layer, and a second electrode over the negative electrode active material layer. The comparison circuit includes a first transistor. The first transistor includes an oxide semiconductor over the first substrate, a first insulator over the oxide semiconductor, and a gate electrode over the first insulator. The piezoelectric element includes a third electrode, a piezoelectric layer over the third electrode, and a fourth electrode over the piezoelectric layer. The first electrode is electrically connected to the gate electrode of the first transistor. The comparison circuit has a function of outputting a first signal in response to a result of comparison between a potential of the first electrode and a desired potential to the control circuit. The control circuit has a function of controlling charging of the first battery cell in accordance with the first signal.

In the above structure, it is preferable that the first electrode and the third electrode each include a titanium compound.

Another embodiment of the present invention is an electronic device including a first substrate, a first battery cell, a comparison circuit, a display portion, and a driver circuit. The first substrate is selected from a glass substrate, a quartz substrate, a sapphire substrate, a ceramic substrate, a metal substrate, a semiconductor substrate, an SOI substrate, and a plastic substrate. The first battery cell includes a first electrode over the first substrate, a positive electrode active material layer over the first electrode, an electrolyte layer over the positive electrode active material layer, a negative electrode active material layer over the electrolyte layer, and a second electrode over the negative electrode active material layer. The first electrode includes a titanium compound. The comparison circuit includes a first transistor. The first transistor includes an oxide semiconductor over the first substrate, a source electrode and a drain electrode over the oxide semiconductor, a first insulator over the oxide semiconductor, and a gate electrode over the first insulator. The first electrode is electrically connected to the gate of the first transistor. The driver circuit has a function of supplying an image signal to the display portion. The driver circuit includes a plurality of transistors with an oxide semiconductor.

Another embodiment of the present invention is a power storage device including a first substrate, a first battery cell, a comparison circuit, and a driver circuit. The first battery cell includes a first electrode over the first substrate, a positive electrode active material layer over the first electrode, an electrolyte layer over the positive electrode active material layer, a negative electrode active material layer over the electrolyte layer, and a second electrode over the negative electrode active material layer. The first electrode includes a titanium compound. The comparison circuit includes a first input terminal, a second input terminal, an output terminal, and a first transistor. The first transistor includes an oxide semiconductor over the first substrate, a source electrode and a drain electrode over the oxide semiconductor, a first insulator over the oxide semiconductor, and a gate electrode over the first insulator. The first input terminal is electrically connected to the gate electrode, and the first electrode is electrically connected to the first input terminal. The comparison circuit has a function of outputting a first signal in response to a result of comparison between a potential of the first electrode and a desired reference potential to the control circuit. The control circuit has a function of controlling charging of the first battery cell in accordance with the first signal.

Effect of the Invention

One embodiment of the present invention can provide a novel battery control circuit, a novel battery protection circuit, a power storage device, a semiconductor device, a vehicle, an electronic device, or the like. Another embodiment of the present invention can provide a battery control circuit, a battery protection circuit, a power storage device, a semiconductor device, a vehicle, an electronic device, or the like that consumes low power. Another embodiment of the present invention can provide a battery control circuit, a battery protection circuit, a power storage device, a semiconductor device, a vehicle, an electronic device, or the like that is highly integrated.

Note that the effects of one embodiment of the present invention are not limited to the effects listed above. The effects listed above do not preclude the existence of other effects. The other effects are effects that are not described in this section and will be described below. The effects that are not described in this section are derived from the description of the specification, the drawings, or the like and can be extracted as appropriate from the description by those skilled in the art. Note that one embodiment of the present invention has at least one of the effects listed above and/or the other effects. Accordingly, one embodiment of the present invention does not have the effects listed above in some cases.

BRIEF DESCRIPTION OF THE DRAWINGS

FIG. 19A is a diagram illustrating an example of an electronic device. FIG. 19B is a diagram illustrating an example of an electronic device. FIG. 19C is a diagram illustrating an example a flying object. FIG. 19D is a diagram illustrating an example of a vehicle.

MODE FOR CARRYING OUT THE INVENTION

Figures 1A, 1B:
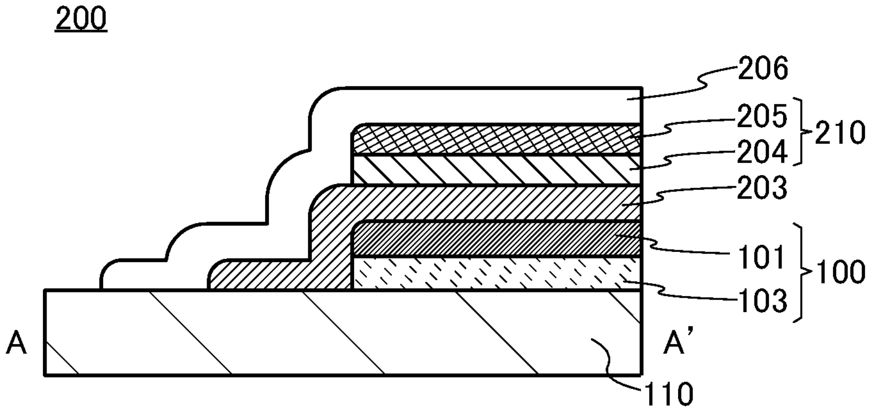
FIG. 1A is a top view of a secondary battery of one embodiment of the present invention.
FIG. 1B is a cross-sectional view of a secondary battery of one embodiment of the present invention.

Hereinafter, embodiments are described with reference to the drawings. Note that the embodiments can be implemented with many different modes, and it is readily understood by those skilled in the art that modes and details thereof can be changed in various ways without departing from the spirit and scope thereof. Thus, the present invention should not be construed as being limited to the following description of the embodiments.

Note that ordinal numbers such as "first," "second," and "third" in this specification and the like are used in order to avoid confusion among components. Thus, the ordinal numbers do not limit the number of components. In addition, the ordinal numbers do not limit the order of components. Furthermore, in this specification and the like, for example, a "first" component in one embodiment can be referred to as a "second" component in other embodiments or claims. Moreover, in this specification and the like, for example, a "first" component in one embodiment can be omitted in other embodiments or claims.

Note that in the drawings, the same elements, elements having similar functions, elements formed of the same material, elements formed at the same time, or the like are sometimes denoted by the same reference numerals, and repeated description thereof is omitted in some cases.

The position, size, range, and the like of each component illustrated in the drawings and the like are not accurately represented in some cases to facilitate understanding of the invention. Therefore, the disclosed invention is not necessarily limited to the position, size, range, and the like disclosed in the drawings and the like. For example, in the actual manufacturing process, a resist mask or the like might be unintentionally reduced in size by treatment such as etching, which is not illustrated in some cases for easy understanding.

In a top view (also referred to as a plan view), a perspective view, or the like, some components might not be illustrated for easy understanding of the drawings.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

Furthermore, in this specification and the like, a "terminal" refers to a wiring or an electrode connected to a wiring in some cases, for example. Moreover, in this specification and the like, part of a "wiring" is referred to as a "terminal" in some cases.

Note that the term "over" or "under" in this specification and the like does not necessarily mean that a component is placed directly over and in contact with or directly under and in contact with another component. For example, the expression "electrode B over insulating layer A" does not necessarily mean that the electrode B is formed on and in direct contact with the insulating layer A, and does not exclude the case where another component is provided between the insulating layer A and the electrode B.

Furthermore, functions of a source and a drain might be switched depending on operation conditions, e.g., when a transistor of opposite polarity is employed or a direction of current flow is changed in circuit operation. Therefore, it is difficult to define which is a source or a drain. Thus, the terms "source" and "drain" can be interchanged with each other in this specification.

In this specification and the like, the expression "electrically connected" includes the case where components are directly connected to each other and the case where components are connected through an "object having any electric function". Here, there is no particular limitation on the "object having any electric function" as long as electric signals can be transmitted and received between components that are connected through the object. Thus, even when the expression "electrically connected" is used, there is a case where no physical connection is made and a wiring just extends in an actual circuit.

In this specification and the like, "parallel" indicates a state where two straight lines are placed at an angle of greater than or equal to −10° and less than or equal to 10°, for example. Accordingly, the case where the angle is greater than or equal to −5° and less than or equal to 5° is also included. Moreover, "perpendicular" and "orthogonal" indicate a state where two straight lines are placed at an angle of greater than or equal to 80° and less than or equal to 100°, for example. Accordingly, the case where the angle is greater than or equal to 85° and less than or equal to 95° is also included.

In this specification and the like, the terms "identical", "the same", "equal", "uniform", and the like used in describing calculation values and actual measurement values allow for a margin of error of ±20% unless otherwise specified.

Furthermore, in this specification, in the case where an etching treatment is performed after a resist mask is formed, the resist mask is removed after the etching treatment, unless otherwise specified.

Note that voltage refers to a potential difference between a given potential and a reference potential (e.g., a ground potential or a source potential) in many cases. Therefore, the terms voltage and potential can be replaced with each other in many cases.

Note that a "semiconductor" has characteristics of an "insulator" when the conductivity is sufficiently low, for example. Thus, a "semiconductor" and an "insulator" can be replaced with each other. In that case, a "semiconductor" and an "insulator" cannot be strictly distinguished from each other because a border therebetween is not clear. Accordingly, a "semiconductor" and an "insulator" in this specification can be replaced with each other in some cases.

Furthermore, a "semiconductor" has characteristics of a "conductor" when the conductivity is sufficiently high, for example. Thus, a "semiconductor" and a "conductor" can be replaced with each other. In that case, a "semiconductor" and a "conductor" cannot be strictly distinguished from each other because a border therebetween is not clear. Accordingly, a "semiconductor" and a "conductor" in this specification can be replaced with each other in some cases.

Note that in this specification and the like, an "on state" of a transistor refers to a state in which a source and a drain of the transistor are regarded as being electrically short-circuited (also referred to as a "conduction state"). Furthermore, an "off state" of a transistor refers to a state in which a source and a drain of the transistor are regarded as being electrically disconnected (also referred to as a "non-conduction state").

In addition, in this specification and the like, an "on-state current" sometimes refers to a current that flows between a source and a drain when a transistor is in an on state. Furthermore, an "off-state current" sometimes refers to a current that flows between a source and a drain when a transistor is in an off state.

In this specification and the like, a high power supply potential VDD (hereinafter also simply referred to as "VDD" or an "H potential") is a power supply potential higher than a low power supply potential VSS. The low power supply potential VSS (hereinafter also simply referred to as "VSS" or an "L potential") is a power supply potential lower than the high power supply potential VDD. In addition, a ground potential can be used as VDD or VSS. For example, in the case where VDD is the ground potential, VSS is a potential lower than the ground potential, and in the case where VSS is the ground potential, VDD is a potential higher than the ground potential.

In this specification and the like, a gate refers to part or the whole of a gate electrode and a gate wiring. A gate wiring refers to a wiring for electrically connecting at least one gate electrode of a transistor to another electrode or another wiring.

In this specification and the like, a source refers to part or the whole of a source region, a source electrode, and a source wiring. A source region refers to a region in a semiconductor layer where the resistivity is lower than or equal to a given value. A source electrode refers to part of a conductive layer which is connected to a source region. A source wiring refers to a wiring for electrically connecting at least one source electrode of a transistor to another electrode or another wiring.

Moreover, in this specification and the like, a drain refers to part or all of a drain region, a drain electrode, or a drain wiring. A drain region refers to a region in a semiconductor layer where the resistivity is lower than or equal to a given value. A drain electrode refers to part of a conductive layer which is connected to a drain region. A drain wiring refers to a wiring for electrically connecting at least one drain electrode of a transistor to another electrode or another wiring.

Embodiment 1

A secondary battery of one embodiment of the present invention will be described with reference to FIG. 1.

[Structure of Secondary Battery]

FIG. 1A and FIG. 1B show a specific example of a secondary battery 200 of one embodiment of the present invention. The secondary battery 200 formed over a substrate 110 is described here.

FIG. 1A is a top view, and FIG. 1B is a cross-sectional view taken along a line A-A' in FIG. 1A. The secondary battery 200 is a thin-film battery in which a stack including a positive electrode 100 and a solid electrolyte layer 203 is formed over the substrate 110 and a negative electrode 210 is formed over the solid electrolyte layer 203, as illustrated in FIG. 1B. The positive electrode 100 includes a positive electrode current collector 103 and a positive electrode active material layer 101 over the positive electrode current collector 103. The negative electrode 210 includes a negative electrode active material layer 204 and a negative electrode current collector 205 over the negative electrode active material layer 204. The solid electrolyte layer 203 is provided between the positive electrode active material layer 101 and the negative electrode active material layer 204.

In the secondary battery 200, a protective layer 206 is preferably formed over the positive electrode 100, the solid electrolyte layer 203, and the negative electrode 210.

Films for forming these layers can be formed using metal masks. The positive electrode current collector 103, the positive electrode active material layer 101, the solid electrolyte layer 203, the negative electrode active material layer 204, and the negative electrode current collector 205 can be selectively formed by a sputtering method. Furthermore, the solid electrolyte layer 203 may be selectively formed using a metal mask by a co-evaporation method.

As illustrated in FIG. 1A, part of the negative electrode current collector 205 is exposed to form a negative electrode terminal portion. In addition, part of the positive electrode current collector 103 is exposed to form a positive electrode terminal portion. A region other than the negative electrode terminal portion and the positive electrode terminal portion is covered with the protection layer 206.

For the positive electrode current collector 103, a material having conductivity is preferably used. Moreover, a material that is likely to inhibit oxidation is preferably used. For example, it is possible to use a titanium compound such as titanium oxide, titanium nitride, titanium oxide in which nitrogen is substituted for part of oxygen, titanium nitride in which oxygen is substituted for part of nitrogen, or titanium oxynitride ($TiO_xN_y$, where $0<x<2$ and $0<y<1$). Titanium nitride is particularly preferable because it has high conductivity and has a high capability of inhibiting oxidation. The use of titanium nitride can stabilize the crystal structure of the positive electrode active material layer 101 in some cases.

A stacked-layer structure may be used for the positive electrode current collector 103. For example, a first layer containing a metal such as gold, platinum, aluminum, titanium, copper, magnesium, iron, cobalt, nickel, zinc, germanium, indium, silver, or palladium, or a material such as an alloy of the above metals may be provided, and a second layer containing a titanium compound may be stacked over the first layer.

Examples of materials for the solid electrolyte layer 203 include $Li_{0.35}La_{0.55}TiO_3$, $La_{(2/3-X)}Li_{3X}TiO_3$, $Li_3PO_4$, $Li_XPO_{(4-Y)}N_Y$, $LiNb_{(1-X)}Ta_{(X)}WO_6$, $Li_7La_3Zr_2O_{12}$, $Li_{(1+X)}Al_{(X)}Ti_{(2-X)}(PO_4)_3$, $Li_{(1+X)}Al_{(X)}Ge_{(2-X)}(PO_4)_3$, and $LiNbO_2$. Note that $X>0$ and $Y>0$. As a deposition method, a sputtering method, an evaporation method, or the like can be used.

The solid electrolyte layer 203 may have a stacked-layer structure. In the case of a stacked-layer structure, a material in which nitrogen is added to lithium phosphate ($Li_3PO_4$) (the material is also referred to as $Li_3PO_{(4-Z)}N_Z$:LiPON) may be stacked as one of the layers. Note that $Z>0$.

The solid electrolyte layer 203 can be formed by a sputtering method, for example.

The positive electrode active material layer 101 contains lithium, a transition metal M, and oxygen. In other words, the positive electrode active material layer 101 includes a composite oxide containing lithium and the transition metal M.

As the transition metal M contained in the positive electrode active material layer 101, a metal that can form, together with lithium, a layered rock-salt composite oxide belonging to the space group R-3m is preferably used. As the transition metal M, one or more of manganese, cobalt, and nickel can be used, for example. That is, as the transition metal contained in the positive electrode active material layer 101, only cobalt may be used; only nickel may be used; two metals of cobalt and manganese or cobalt and nickel may be used; or three metals of cobalt, manganese, and nickel may be used. In other words, the positive electrode active material layer 101 can include a composite oxide containing lithium and the transition metal M, such as lithium cobalt oxide, lithium nickel oxide, lithium cobalt oxide in which manganese is substituted for part of cobalt, lithium cobalt oxide in which nickel is substituted for part of cobalt, or lithium nickel-manganese-cobalt oxide.

In addition to the above, the positive electrode active material layer 101 may contain an element other than the transition metal M, such as magnesium, fluorine, or aluminum. Such elements further stabilize a crystal structure included in the positive electrode active material layer 101 in some cases. In other words, the positive electrode active material layer 101 can contain lithium cobalt oxide to which magnesium and fluorine are added, lithium nickel-cobalt oxide to which magnesium and fluorine are added, lithium cobalt-aluminum oxide to which magnesium and fluorine are added, lithium nickel-cobalt-aluminum oxide, lithium nickel-cobalt-aluminum oxide to which magnesium and fluorine are added, or the like.

When the positive electrode active material layer 101 contains lithium, cobalt, nickel, aluminum, magnesium, oxygen, and fluorine, given that the proportion of cobalt atoms included in the positive electrode active material layer 101 is 100, the proportion of nickel atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Given that the proportion of cobalt atoms included in the positive electrode active material layer 101 is 100, the proportion of aluminum atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Given that the proportion of cobalt atoms included in the positive electrode active material layer 101 is 100, the proportion of magnesium atoms is preferably greater than or equal to 0.1 and less than or equal to 6, further preferably greater than or equal to 0.3 and less than or equal to 3, for example. Given that the proportion of magnesium atoms included in the positive electrode active material layer 101 is 1, the proportion of fluorine atoms is preferably greater than or equal to 2 and less than or equal to 3.9, for example.

When nickel, aluminum, and magnesium are contained at the above concentrations, a stable crystal structure can be maintained even if charge and discharge are repeated at high voltage. Thus, the positive electrode active material layer 101 can have high capacity and excellent charge and discharge performance.

The molar concentration of cobalt, nickel, aluminum, and magnesium can be measured by inductively coupled plasma mass spectrometry (ICP-MS), for example. The molar concentration of fluorine can be measured by glow discharge mass spectrometry (GD-MS), for example.

As the positive electrode active material, a composite oxide with a spinel crystal structure can be used, for example. Alternatively, a polyanionic material can be used as the positive electrode active material, for example. Examples of the polyanionic material include a material with an olivine crystal structure and a material with a NASICON structure. Alternatively, a material containing sulfur can be used as the positive electrode active material, for example.

As the material with a spinel crystal structure, for example, a composite oxide represented by a general formula $LiM_2O_4$ can be used. In the general formula $LiM_2O_4$, Mn is preferably contained as the element M. For example, $LiMn_2O_4$ can be used. In the general formula $LiMn_2O_4$, is preferable to contain Ni in addition to Mn as the element M because the discharge voltage and the energy density of the secondary battery are increased in some cases. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese, such as $LiMn_2O_4$, because the performance of the secondary battery can be improved.

As a polyanionic material, for example, a composite oxide containing oxygen, the metal A, the metal M, and an element Z can be used. The metal A contained in the polyanionic material is one or more of Li, Na, and Mg; the metal M contained in the polyanionic material is one or more of Fe, Mn, Co, Ni, Ti, V, and Nb; and the element Z is one or more of S, P, Mo, W, As, and Si.

As the material with an olivine crystal structure, for example, a composite material (the general formula $LiMPO_4$ (M is one or more of Fe(II), Mn(II), Co(II), and Ni(II)) can be used. Typical examples of the general formula $LiMPO_4$ include lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCoe_bO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<<1).

Alternatively, a composite material such as a general formula $Li_{(2-j)}MSiO_4$ (M is one or more of Fe(II), Mn(II), Co(II), and Ni(II); 0≤j≤2) can be used. Typical examples of the general formula $Li_{(2-j)}MSiO_4$ include lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(1-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by a general formula $A_xM_2(XO_4)_3$ (A=Li, Na, or Mg, M=Fe, Mn, Ti, V, or Nb, X=S, P, Mo, W, As, or Si) can be used. Examples of the NASICON compound include $Fe_2(MnO_4)_3$, $Fe_2(SO_4)_3$, and $Li_3Fe_2(PO_4)_3$. Further alternatively, a compound represented by a general formula $Li_2MPO_4F$, $Li_2MP_2O_7$, or $Li_5MO_4$ (M=Fe or Mn) can be used as the positive electrode active material.

Further alternatively, a perovskite fluoride such as $NaFeF_3$ and $FeF_3$, a metal chalcogenide (a sulfide, a selenide, or a telluride) such as $TiS_2$ and $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like may be used as the positive electrode active material.

Alternatively, a borate-based material represented by a general formula $LiMBO_3$ (M is Fe(II), Mn(II), or Co(II)) may be used as the positive electrode active material.

As a material containing sodium, for example, an oxide containing sodium such as $NaFeO_2$, $Na_{2/3}[Fe_{1/2}Mn_{1/2}]O_2$, $Na_{2/3}[Ni_{1/3}Mn_{2/3}]O_2$, $Na_2Fe_2(SO_4)_3$, $Na_3V_2(PO_4)_3$, $Na_2FePO_4F$, $NaVPO_4F$, $NaMPO_4$ (M is Fe(II), Mn(II), Co(II), or Ni(II)), $Na_2FePO_4F$, or $Na_4Co_3(PO_4)_2P_2O_7$ may be used as the positive electrode active material.

As the positive electrode active material, a lithium-containing metal sulfide may be used. Examples of the lithium-containing metal sulfide are $Li_2TiS_3$ and $Li_3NbS_4$.

A mixture of two or more of the above-described materials may be used as the positive electrode active material of one embodiment of the present invention.

For the negative electrode active material layer 204, silicon, carbon, titanium oxide, vanadium oxide, indium oxide, zinc oxide, tin oxide, nickel oxide, or the like can be used. A material that is alloyed with Li, such as tin, gallium, or aluminum can be used. Alternatively, an oxide of such a metal that is alloyed with Li may be used. A lithium titanium oxide ($Li_4Ti_5O_{12}$, $LiTi_2O_4$, or the like) may also be used. A material containing silicon and oxide (also referred to as a $SiO_x$ film), in particular, is preferably used for the negative electrode active material layer 204. A Li metal may also be used for the negative electrode active material layer 204.

Note that in the secondary battery 200, a plurality of sets each set consisting of a positive electrode, a solid electrolyte layer, and a negative electrode, may be stacked and connected in series to increase the voltage of the secondary battery.

This embodiment can be implemented in appropriate combination with the other embodiments.

Embodiment 2

In this embodiment, a structure example of a power storage device of one embodiment of the present invention will be described.

The power storage device of one embodiment of the present invention includes a secondary battery and a battery control circuit. The battery control circuit has a function of protecting the secondary battery, for example. The battery control circuit also has a function of controlling charging of the secondary battery, for example. The battery control circuit also has a function of monitoring the voltage of the secondary battery, for example.

The battery control circuit of one embodiment of the present invention preferably includes a transistor containing an oxide semiconductor in a channel formation region (hereinafter referred to as an OS transistor). The details of the battery control circuit with an OS transistor will be described later. The battery control circuit of one embodiment of the present invention may include, in addition to an OS transistor, a transistor containing silicon, germanium, silicon germanium, silicon carbide, or the like in a channel formation region.

Figure 2:
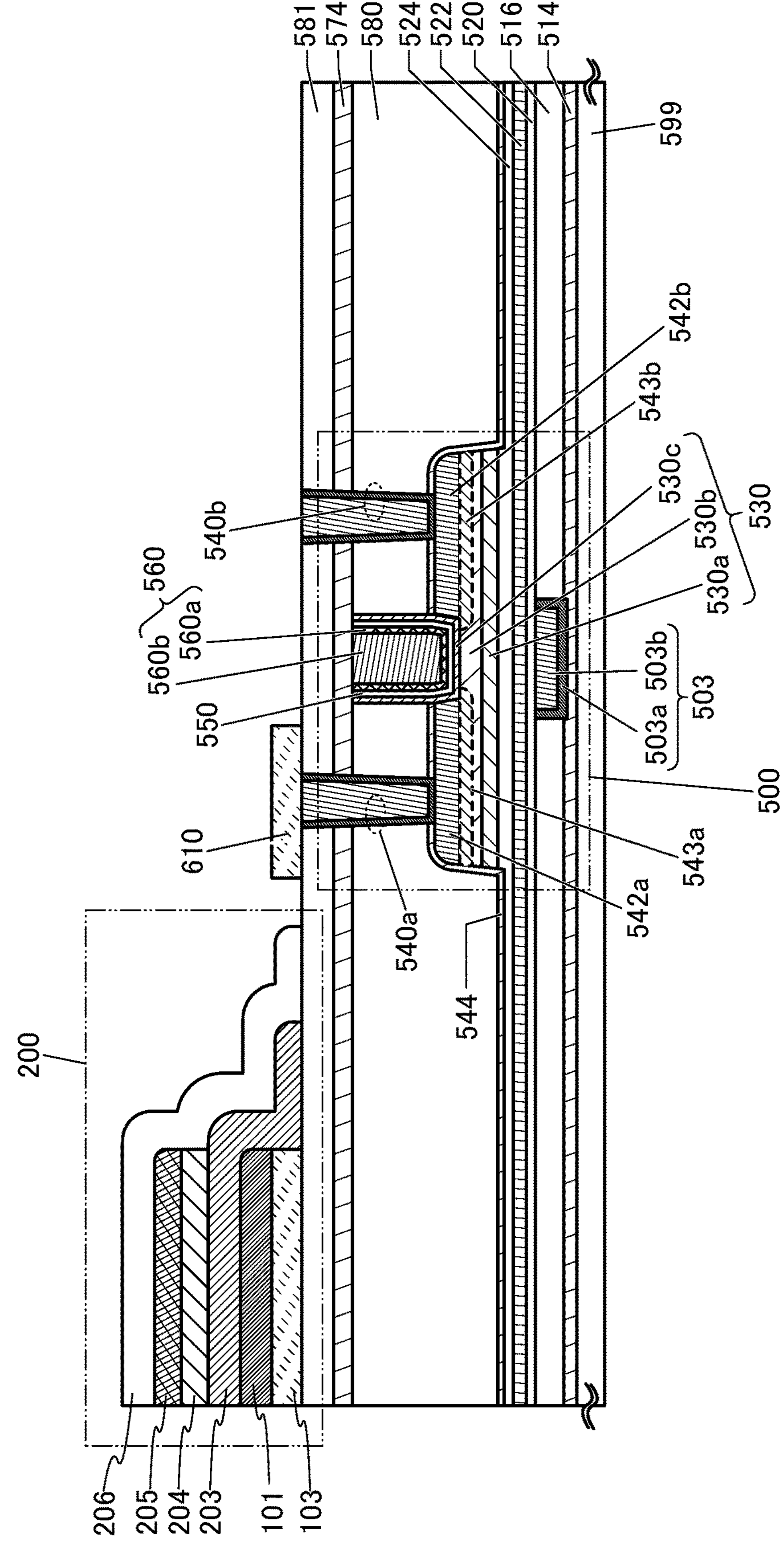
FIG. 2 is a cross-sectional view showing one embodiment of the present invention.

FIG. 2 shows a structure example applicable to the power storage device of one embodiment of the present invention. The structure example shown in FIG. 2 is an example in which the secondary battery 200 and a transistor 500, an OS transistor included in the battery control circuit, are stacked over a substrate 599. Although an example in which one secondary battery is provided over the substrate 599 is shown in FIG. 2, two or more secondary batteries may be provided over the substrate 599. In that case, for example, either the positive electrode or the negative electrode may be shared by the secondary batteries. In addition, it is preferable that their positive electrodes, negative electrodes, electrolytes, or the like are formed using the same materials.

A glass substrate, a quartz substrate, a sapphire substrate, a ceramic substrate, a metal substrate (e.g., a stainless steel substrate, a substrate including stainless steel foil, a tungsten substrate, or a substrate including tungsten foil), a semiconductor substrate (e.g., a single crystal semiconductor substrate, a polycrystalline semiconductor substrate, or a compound semiconductor substrate), an SOI (Silicon on Insulator) substrate, a plastic substrate, or the like can be used as the substrate 599. Alternatively, a flexible substrate, a laminate film, paper including a fibrous material, a base film, or the like can be used as the substrate. As examples of the flexible substrate, the laminate film, the base material film, and the like, the following can be given. Examples include plastics typified by polyethylene terephthalate (PET), polyethylene naphthalate (PEN), polyether sulfone (PES), and polytetrafluoroethylene (PTFE). Another example is a synthetic resin such as acrylic. Other examples are polypropylene, polyester, polyvinyl fluoride, and polyvinyl chloride. Other examples are polyamide, polyimide, an aramid resin, an epoxy resin, an inorganic vapor deposition film, and paper.

In FIG. 2, an insulator 514 is provided over the substrate 599. As the insulator 514, a film having a barrier property that prevents diffusion of hydrogen or impurities is preferably used. The insulator 514 is formed using, for example, silicon oxide, silicon oxynitride, silicon nitride oxide, silicon nitride, aluminum oxide, aluminum oxynitride, aluminum nitride oxide, or aluminum nitride.

Note that in this specification, silicon oxynitride refers to a material that has a higher oxygen content than a nitrogen content, and silicon nitride oxide refers to a material that has a higher nitrogen content than an oxygen content. In this specification, aluminum oxynitride refers to a material that has a higher oxygen content than a nitrogen content, and aluminum nitride oxide refers to a material that has a higher nitrogen content than an oxygen content.

<Transistor 500>

In the transistor 500, a metal oxide functioning as an oxide semiconductor is preferably used for the oxide 530 including the channel formation region. For example, as the oxide 530, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used.

Specifically, as the oxide 530*a*, a metal oxide with In:Ga:Zn=1:3:4 [atomic ratio] or 1:1:0.5 [atomic ratio] is used. As the oxide 530*b*, a metal oxide with In:Ga:Zn=4:2:3 [atomic ratio] or 1:1:1 [atomic ratio] is used. As the oxide 530*c*, a metal oxide with In:Ga:Zn=1:3:4 [atomic ratio], Ga:Zn=2:1 [atomic ratio], or Ga:Zn=2:5 [atomic ratio] is used. Specific examples of the oxide 530*c* having a stacked-layer structure include a stacked-layer structure of In:Ga:Zn=4:2:3 [atomic ratio] and In:Ga:Zn=1:3:4 [atomic ratio], a stacked-layer structure of Ga:Zn=2:1 [atomic ratio] and In:Ga:Zn=4:2:3 [atomic ratio], a stacked-layer structure of Ga:Zn=2:5 [atomic ratio] and In:Ga:Zn=4:2:3 [atomic ratio], and a stacked-layer structure of gallium oxide and In:Ga:Zn=4:2:3 [atomic ratio].

The oxide 530*b* may have crystallinity. For example, a CAAC-OS (c-axis aligned crystalline oxide semiconductor) described later is preferably used. An oxide having crystallinity, such as a CAAC-OS, has a dense structure with small amounts of impurities and defects (e.g., oxygen vacancies) and high crystallinity. This can inhibit extraction of oxygen from the oxide 530*b* by the source electrode or the drain electrode. Oxygen extraction from the oxide 530*b* can be suppressed even when heat treatment is performed; thus, the transistor 500 is stable with respect to high temperatures in the manufacturing process (what is called thermal budget).

The metal oxide functioning as the channel formation region in the oxide 530 has a band gap of more than or equal to 2 eV, preferably more than or equal to 2.5 eV. With the use of a metal oxide having such a wide bandgap, the off-state current of the transistor can be reduced.

When the oxide 530 includes the oxide 530*a* under the oxide 530*b*, it is possible to inhibit diffusion of impurities into the oxide 530*b* from the components formed below the oxide 530*a*. Moreover, including the oxide 530*c* over the oxide 530*b* makes it possible to inhibit diffusion of impurities into the oxide 530*b* from the components formed above the oxide 530*c*.

Note that the oxide 530 preferably has a stacked-layer structure of a plurality of oxide layers that differ in the atomic ratio of metal atoms. Specifically, the atomic ratio of the element M to the constituent elements in the metal oxide used as the oxide 530*a* is preferably higher than the atomic ratio of the element M to the constituent elements in the metal oxide used as the oxide 530*b*. In addition, the atomic ratio of the element M to In in the metal oxide used as the oxide 530*a* is preferably higher than the atomic ratio of the element M to In in the metal oxide used as the oxide 530*b*. Furthermore, the atomic ratio of In to the element Min the metal oxide used as the oxide 530*b* is preferably higher than the atomic ratio of In to the element M in the metal oxide used as the oxide 530*a*. Moreover, a metal oxide that can be used as the oxide 530*a* or the oxide 530*b* can be used as the oxide 530*c*.

In addition, the energy of the conduction band minimum of each of the oxide 530*a* and the oxide 530*c* is preferably higher than the energy of the conduction band minimum of the oxide 530*b*. In other words, the electron affinity of each of the oxide 530*a* and the oxide 530*c* is preferably smaller than the electron affinity of the oxide 530*b*.

Here, the energy level of the conduction band minimum gradually changes at junction portions of the oxide 530*a*, the oxide 530*b*, and the oxide 530*c*. In other words, the energy level of the conduction band minimum at the junction portions of the oxide 530*a*, the oxide 530*b*, and the oxide 530*c* continuously changes or is continuously connected. To obtain this, the densities of defect states in mixed layers formed at an interface between the oxide 530*a* and the oxide 530*b* and an interface between the oxide 530*b* and the oxide 530*c* are preferably made low.

Specifically, when the oxide 530*a* and the oxide 530*b* or the oxide 530*b* and the oxide 530*c* contain a common element (as a main component) in addition to oxygen, a mixed layer with a low density of defect states can be formed. For example, in the case where the oxide 530*b* is an In—Ga—Zn oxide, an In—Ga—Zn oxide, a Ga—Zn oxide, gallium oxide, or the like is preferably used as the oxide 530*a* and the oxide 530*c*.

At this time, the oxide 530*b* serves as a main carrier path. When the oxide 530*a* and the oxide 530*c* have the above structures, the densities of defect states at the interface between the oxide 530*a* and the oxide 530*b* and the interface between the oxide 530*b* and the oxide 530*c* can be made low. Thus, the influence of interface scattering on carrier conduction is small, and the transistor 500 can have a high on-state current.

The conductor 542*a* and the conductor 542*b* functioning as the source electrode and the drain electrode are provided over the oxide 530*b*. For the conductor 542*a* and conductor 542*b*, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element; an alloy containing a combination of the above metal element; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

In addition, although the conductor 542*a* and the conductor 542*b* each having a single-layer structure are shown in FIG. 2, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

Figures 13A, 13B:
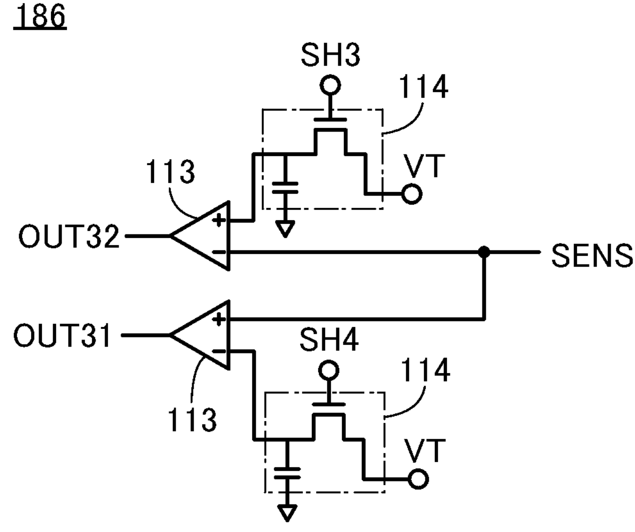
FIG. 13A is a circuit diagram illustrating one embodiment of the present invention.
FIG. 13B is a circuit diagram illustrating one embodiment of the present invention.

In addition, as shown in FIG. 13A, a region 543*a* and a region 543*b* are sometimes formed as low-resistance regions at an interface between the oxide 530 and the conductor 542*a* (the conductor 542*b*) and in the vicinity of the interface. In that case, the region 543*a* functions as one of a source region and a drain region, and the region 543*b* functions as the other of the source region and the drain region. Furthermore, the channel formation region is formed in a region between the region 543*a* and the region 543*b*.

When the conductor 542*a* (the conductor 542*b*) is provided to be in contact with the oxide 530, the oxygen concentration in the region 543*a* (the region 543*b*) sometimes decreases. In addition, a metal compound layer that contains the metal contained in the conductor 542*a* (the conductor 542*b*) and the component of the oxide 530 is sometimes formed in the region 543*a* (the region 543*b*). In such a case, the carrier density of the region 543*a* (the region 543*b*) increases, and the region 543*a* (the region 543*b*) becomes a low-resistance region.

The insulator 544 is provided to cover the conductor 542*a* and the conductor 542*b* and inhibits oxidation of the conductor 542*a* and the conductor 542*b*. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is unlikely to be crystallized by heat treatment in a later step. Note that the insulator 544 is not an essential component when the conductor 542*a* and the conductor 542*b* are oxidation-resistant materials or do not significantly lose their conductivity even after absorbing oxygen. Design is appropriately set in consideration of required transistor characteristics.

When the insulator 544 is included, diffusion of impurities such as water and hydrogen contained in the insulator 580 into the oxide 530*b* through the oxide 530*c* and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with an inner side (a top surface and a side surface) of the oxide 530*c*. Like the insulator 524, the insulator 550 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator from which oxygen is released by heating is provided as the insulator 550 in contact with the top surface of the oxide 530*c*, oxygen can be effectively supplied from the insulator 550 to the channel formation region of the oxide 530*b* through the oxide 530*c*. Furthermore, as in the insulator 524, the concentration of impurities such as water or hydrogen in the insulator 550 is preferably reduced. The thickness of the insulator 550 is preferably greater than or equal to 1 nm and less than or equal to 20 nm.

Furthermore, to efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current might arise because of a thinner gate insulating film. For that reason, when the insulator functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high relative permittivity.

Although the conductor 560 that functions as the first gate electrode and has a two-layer structure is shown in FIG. 2, a single-layer structure or a stacked-layer structure of three or more layers may be employed.

For the conductor 560*a*, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560*a* has a function of inhibiting diffusion of oxygen, it is possible to inhibit a reduction in conductivity of the conductor 560*b* due to oxidation caused by oxygen contained in the insulator 550. As a conductive material having a function of inhibiting diffusion of oxygen, for example, tantalum, tantalum nitride, ruthenium, ruthenium oxide, or the like is preferably used. For the conductor 560*a*, the oxide semiconductor that can be used as the oxide 530 can be used. In that case, when the conductor 560*b* is deposited by a sputtering method, the conductor 560*a* can have a reduced electrical resistance value to be a conductor. Such a conductor can be referred to as an OC (Oxide Conductor) electrode.

In addition, a conductive material containing tungsten, copper, or aluminum as its main component is preferably used for the conductor 560*b*. Furthermore, the conductor 560*b* also functions as a wiring and thus a conductor having high conductivity is preferably used as the conductor 560*b*. For example, a conductive material containing tungsten, copper, or aluminum as its main component can be used. Moreover, the conductor 560*b* may have a stacked-layer structure, for example, a stacked-layer structure of the above conductive material and titanium or titanium nitride.

The insulator 580 is provided over the conductor 542*a* and the conductor 542*b* with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, resin, or the like. In particular, silicon oxide and silicon oxynitride are preferable because they are thermally stable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided in contact with the oxide 530*c*, oxygen in the insulator 580 can be efficiently supplied to the oxide 530 through the oxide 530*c*. Note that the concentration of impurities such as water or hydrogen in the insulator 580 is preferably reduced.

The opening of the insulator 580 is formed to overlap with the region between the conductor 542*a* and the conductor 542*b*. Accordingly, the conductor 560 is formed to be embedded in the opening of the insulator 580 and the region between the conductor 542*a* and the conductor 542*b*.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, excess-oxygen regions can be provided in the insulator 550 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540*a* and a conductor 540*b* are positioned in openings formed in the insulator 581, the insulator 574, the insulator 580, and the insulator 544. The conductor 540*a* and the conductor 540*b* are provided to face each other with the conductor 560 therebetween.

A conductor 610 and the secondary battery 200 are provided over the insulator 581. The conductor 610 functions as a wiring connected to the conductor 540*a*.

It is preferable that the same material as that of the positive electrode current collector 103 be used for the conductor 610. When the same material is used for the conductor 610 and the positive electrode current collector 103, the conductor 610 and the positive electrode current collector 103 can be formed using the same process, which facilitates the fabrication.

Figure 3:
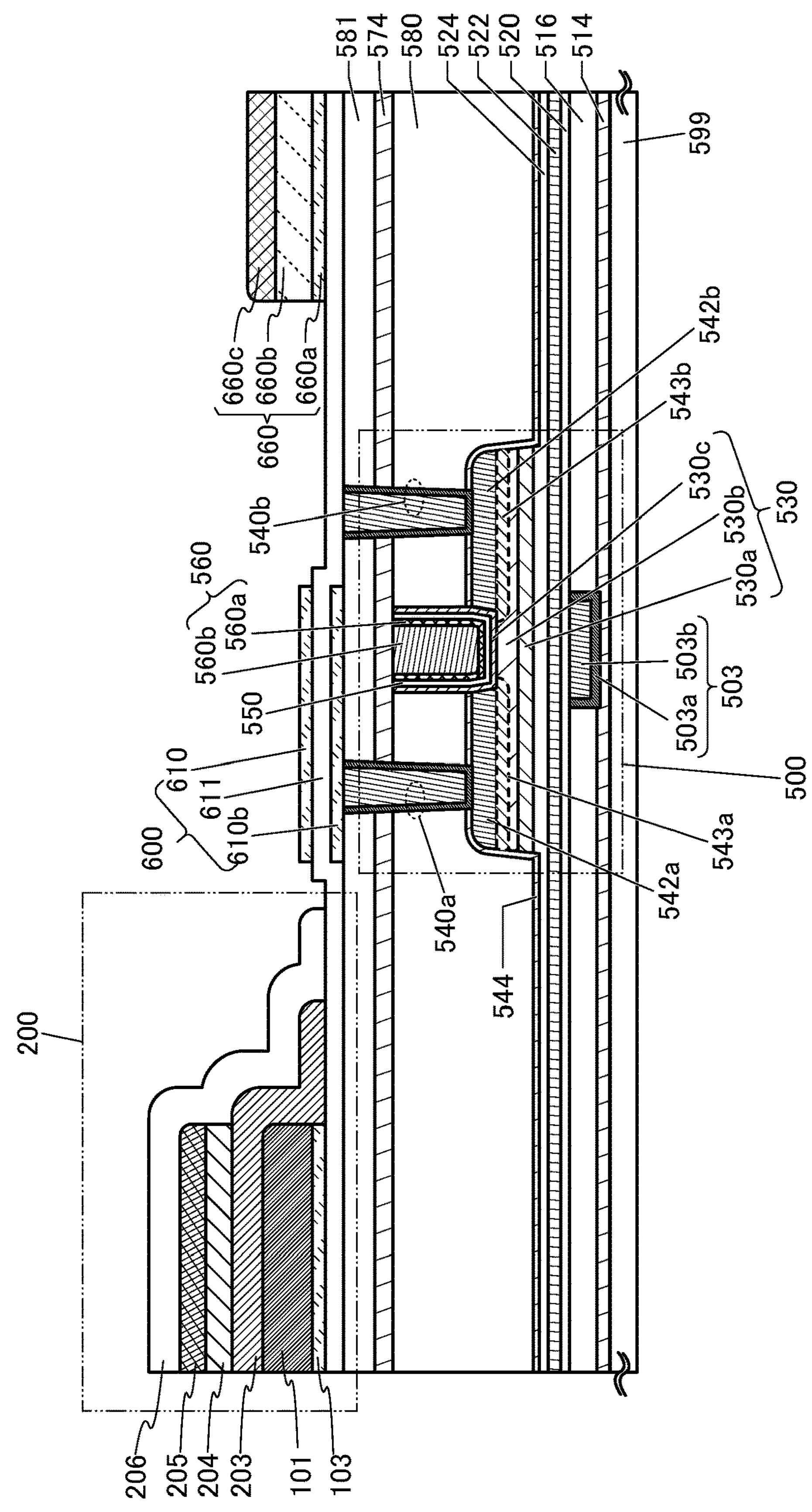
FIG. 3 is a cross-sectional view showing one embodiment of the present invention.

FIG. 3 is different from FIG. 2 in that a capacitor 600 and a sensor element 660 are provided over the insulator 581.

In a structure example shown in FIG. 3: the insulator 514 is provided over the substrate 599; the transistor 500 is provided over the insulator 514; the insulator 574 and the insulator 581 are provided over the transistor 500; the conductor 540*a* and the conductor 540*b* are formed to be embedded in the insulator 580, the insulator 574, and the insulator 581; the conductor 540*a* functions as a plug connected to the conductor 542*a*; and the conductor 540*b* functions as a plug connected to the conductor 542*b*.

In FIG. 3, a conductor 610*b* is provided over the insulator 581, an insulator 611 is provided over the conductor 610*b* and the insulator 581, and a conductor 610 is provided over the insulator 611 to overlap with the conductor 610*b*. The conductor 610 and the conductor 610*b* function as electrodes of the capacitor 600, and a region in the insulator 611 sandwiched between the conductor 610 and the conductor 610*b* functions as a dielectric of the capacitor 600.

In FIG. 3, the secondary battery 200 and the sensor element 660 are provided over the insulator 611.

The sensor element 660 includes a conductor 660*a* over the insulator 611, a conductor 660*c* over the conductor 660*a*, and a layer 660*b* sandwiched between the conductor 660*a* and the conductor 660*c*.

It is preferable that the same material as that of the positive electrode current collector 103 be used for the conductor 610 and the conductor 660*a*.

As the sensor element 660, a pressure sensor, a piezoelectric sensor, an acceleration sensor, a gyroscope sensor, a magnetic sensor, an optical sensor, an infrared sensor, a distance sensor, a pulse sensor, an ultrasonic sensor, a touch sensor, a fingerprint sensor, or the like can be used, for example.

An example in which a piezoelectric sensor is used as the sensor element 660 will be described below. The use of the piezoelectric sensor enables pressure, displacement, or the like to be sensed.

It is preferable to use a titanium compound as the conductor 660*a*. Specifically, the use of titanium nitride, for example, is preferable. Alternatively, the use of titanium is preferable. The use of titanium nitride increases the crystallinity of the layer 660*b* in some cases. A second conductive layer may be further provided over the conductor 660*a*. For example, a stack of titanium and platinum over titanium may be used. The use of the stack of titanium and platinum over titanium increases the crystallinity of the layer 660*b* in some cases.

As the layer 660*b*, piezoelectric ceramics such as lead zirconate titanate or barium titanate can be used. Lead zirconate titanate is sometimes expressed as $Pb(Zr_xTi_{1-x})O_3$. Barium titanate is sometimes expressed as $BaTiO_3$.

As a buffer layer between the conductor 660*a* and the layer 660*b*, one or more selected from a compound containing strontium ($La_{0.5}Sr_{0.5}CoO_3$, $SrTiO_3$, $SrRuO_3$, or the like, for example), a compound containing lanthanum ($LaNiO_3$), $(Bi,La)_4Ti_3O_{12}$, or the like, for example), a compound containing yttrium ($Y_1Ba_2Cu_3O_{7-x}$ or the like, for example), and the like may be stacked.

Figure 4:
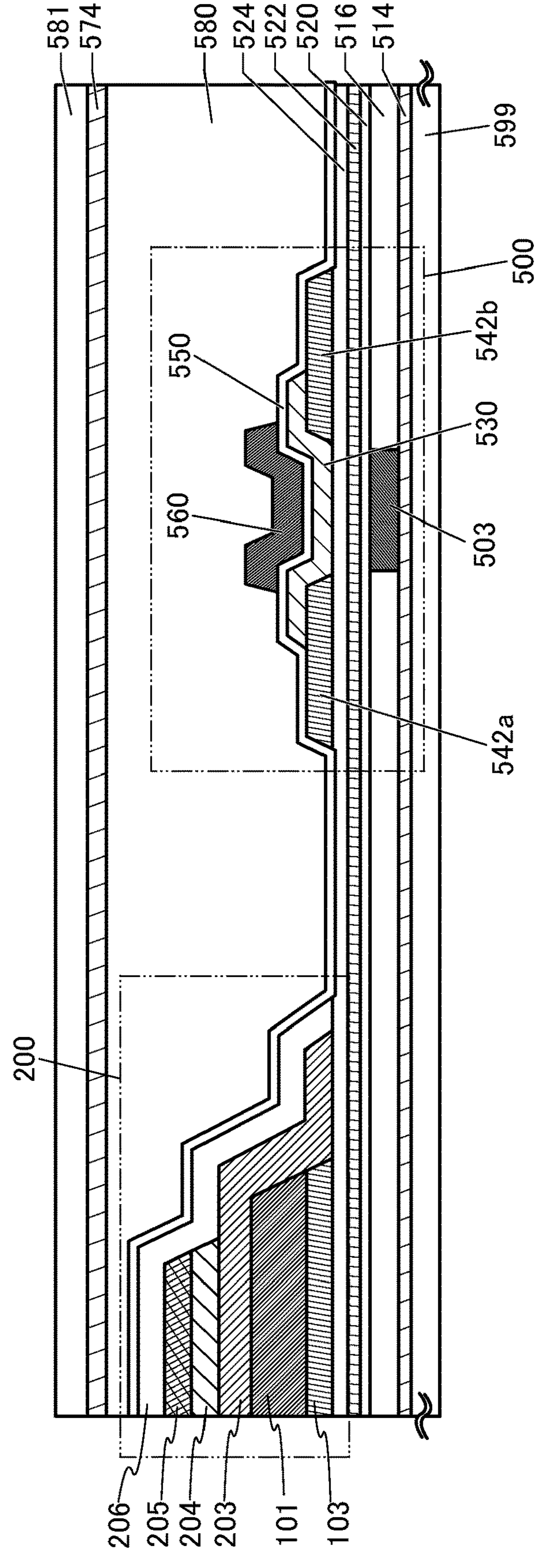
FIG. 4 is a cross-sectional view showing one embodiment of the present invention.

As in a structure example shown in FIG. 4, the transistor 500, which is an OS transistor, and the secondary battery 200 may be provided in a region sandwiched between the insulator 514 and the insulator 574.

The transistor 500 shown in FIG. 4 has a bottom-contact structure. In FIG. 4, the conductor 542*a* and the conductor 542*b* are provided over the insulator 524. In addition, the transistor 500 shown in FIG. 4 includes: the oxide 530 over the insulator 524, the conductor 542*a*, and the conductor 542*b*; the insulator 550 over the oxide 530; and the conductor 560 over the insulator 550. In FIG. 4, the conductor 560 and a conductor 503 are provided to overlap with each other with the oxide 530 therebetween. An insulator 520, an insulator 522, and the insulator 524 are provided between the conductor 503 and the oxide 530.

In FIG. 4, the secondary battery 200 is provided over the insulator 524. An insulating layer 550 is provided over the protective layer 206 of the secondary battery 200, the insulator 580 is provided over the insulating layer 550, and an insulator 574 is provided over the insulator 580.

The conductor 542*a* and the conductor 542*b* function as the source electrode and the drain electrode of the transistor 500. It is preferable that the same material as that of the positive electrode current collector 103 be used for the conductor 542*a* and the conductor 542*b*.

Note that in FIG. 4 and FIG. 5 which will be described later, the transistor structure shown in FIG. 2 or the like may be used for the transistor 500.

Figure 5:
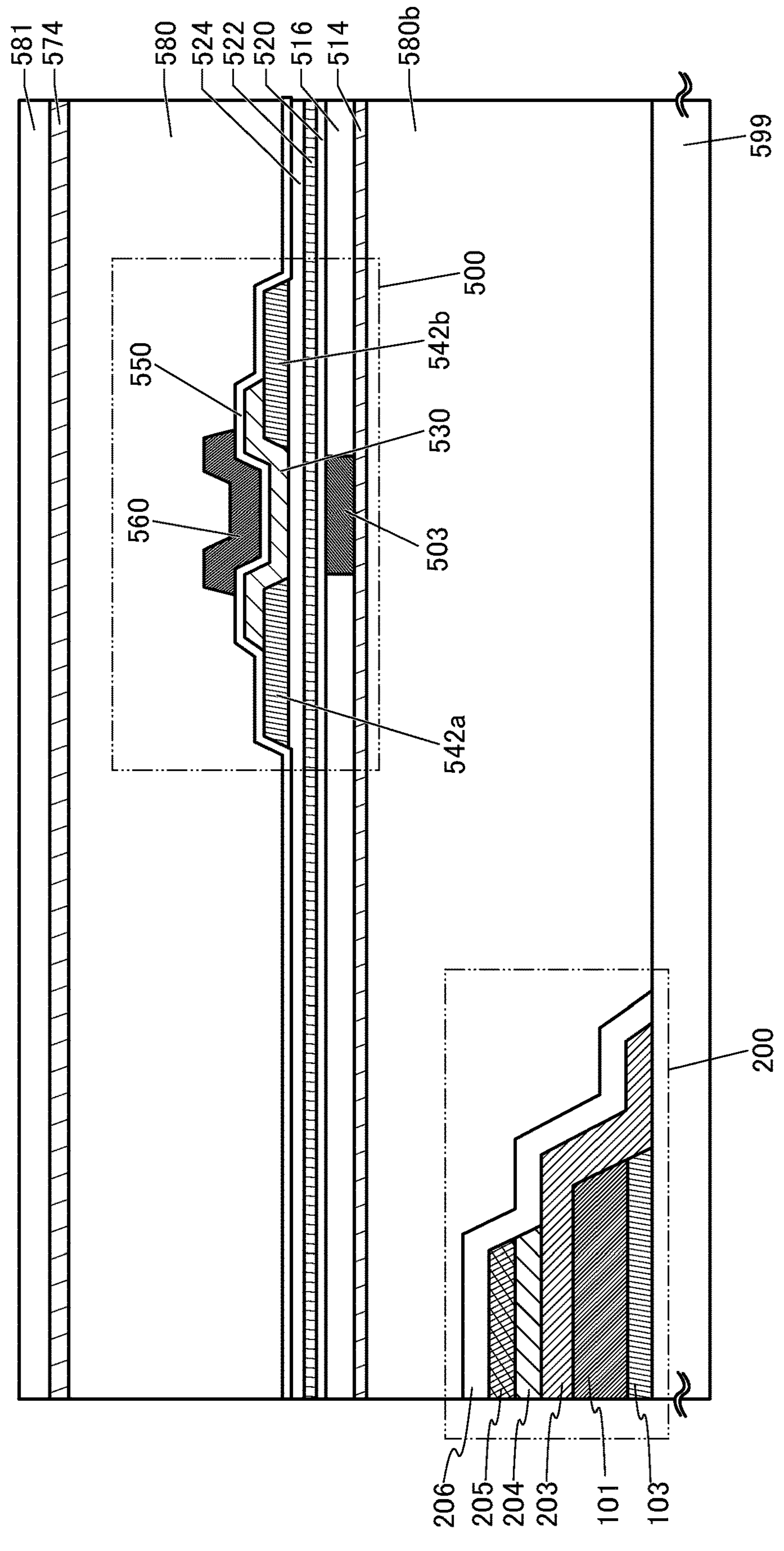
FIG. 5 is a cross-sectional view showing one embodiment of the present invention.

As in the structure example shown in FIG. 5, the following structure may be employed: the secondary battery 200 is provided over the substrate 599, an insulator 580*b* is provided over the secondary battery 200, the insulator 514 is provided over the insulator 580*b*, and the transistor 500 is provided over the insulator 514. The insulator 580 can be referred to for the material and the like that can be used for the insulator 580*b*.

Figure 6:
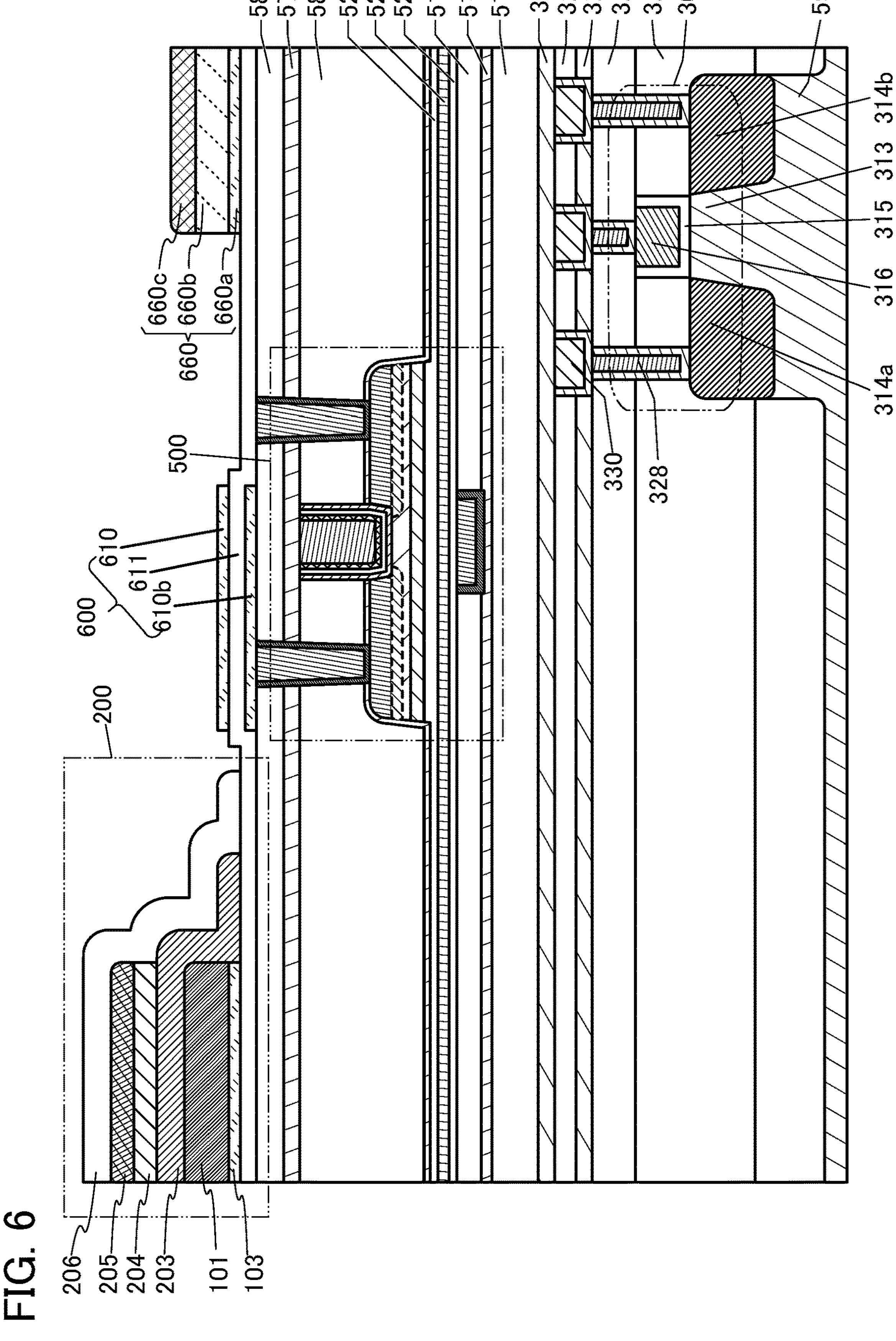
FIG. 6 is a cross-sectional view showing one embodiment of the present invention.

As shown in FIG. 6, the following structure may be employed: silicon, silicon germanium, or silicon carbide is used as the substrate 599, a transistor 300 is provided on the substrate 599, and the insulator 514, the transistor 500, the capacitor 600, the sensor element 660, and the like are provided over the transistor 300. Some of the transistors included in the battery control circuit of one embodiment of the present invention may be formed using the transistor 300, for example.

The transistor 300 shown in FIG. 6 is provided on the substrate 599, and includes a conductor 316, an insulator 315, a semiconductor region 313 composed of part of the substrate 599, a low-resistance region 314*a*, and a low-resistance region 314*b*. One of the low-resistance region 314*a* and the low-resistance region 314*b* functions as a source region, and the other functions as a drain region.

In the transistor 300, a top surface and a side surface in the channel width direction of the semiconductor region 313 are covered with the conductor 316 with the insulator 315 therebetween. Such a Fin-type transistor 300 can have an increased effective channel width, and thus have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

The low-resistance region 314*a* and the low-resistance region 314*b* contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

The transistor 300 may be formed using an SOI (Silicon on Insulator) substrate or the like.

As the SOI substrate, the following substrate may be used: an SIMOX (Separation by Implanted Oxygen) substrate which is formed in such a manner that after an oxygen ion is implanted into a mirror-polished wafer, an oxide layer is formed at a certain depth from the surface and defects generated in a surface layer are eliminated by high-temperature annealing, or an SOI substrate formed by using a Smart-Cut method in which a semiconductor substrate is cleaved by utilizing growth of a minute void, which is formed by implantation of a hydrogen ion, by thermal treatment; an ELTRAN method (a registered trademark: Epitaxial Layer Transfer); or the like. A transistor formed using a single crystal substrate contains a single crystal semiconductor in a channel formation region.

An insulator 320, an insulator 322, an insulator 324, and an insulator 326 are stacked sequentially to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that contains oxygen at a higher proportion than nitrogen, and silicon nitride oxide refers to a material that contains nitrogen at a higher proportion than oxygen. Furthermore, in this specification, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for eliminating a level difference caused by the transistor 300 or the like provided below the insulator 322. For example, a top surface of the insulator 322 may be planarized by planarization treatment using a chemical mechanical polishing (CMP) method or the like to increase planarity.

In addition, for the insulator 324, it is preferable to use a film having a barrier property that prevents diffusion of hydrogen or impurities from the substrate 599, the transistor 300, or the like into a region where the transistor 500 is provided.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per area of the insulator 324 is less than or equal to $10\times10^{15}$ atoms/$cm^2$, preferably less than or equal to $5\times10^{15}$ atoms/$cm^2$, in the TDS analysis in a film-surface temperature range of 50° C. to 500° C., for example.

Note that the permittivity of the insulator 326 is preferably lower than that of the insulator 324. For example, the relative permittivity of the insulator 326 is preferably lower than 4, further preferably lower than 3. The relative permittivity of the insulator 326 is, for example, preferably 0.7 times or less, further preferably 0.6 times or less the relative permittivity of the insulator 324. When a material with a low permittivity is used for an interlayer film, parasitic capacitance generated between wirings can be reduced.

In addition, a conductor 328, a conductor 330, and the like are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

Note that for example, as the insulator 350, like the insulator 324, an insulator having a barrier property against hydrogen is preferably used. Furthermore, the conductor 330 preferably contains a conductor having a barrier property against hydrogen. In particular, the conductor having a barrier property against hydrogen is preferably formed in an opening portion of the insulator having a barrier property against hydrogen. With this structure, the transistor 300 and the transistor 500 can be separated by a barrier layer, so that diffusion of hydrogen from the transistor 300 into the transistor 500 can be inhibited.

Note that for the conductor having a barrier property against hydrogen, tantalum nitride is preferably used, for example. In addition, using a stack of tantalum nitride and tungsten, which has high conductivity, can inhibit diffusion of hydrogen from the transistor 300 while the conductivity of a wiring is kept. In that case, a structure in which a tantalum nitride layer having a barrier property against hydrogen is in contact with the insulator 350 having a barrier property against hydrogen is preferable.

An insulator 512 is provided over the insulator 350, and an insulator 514 is provided over the insulator 512. The insulator 326 can be referred to, for example, for the material that can be used for the insulator 512.

Figure 7A:
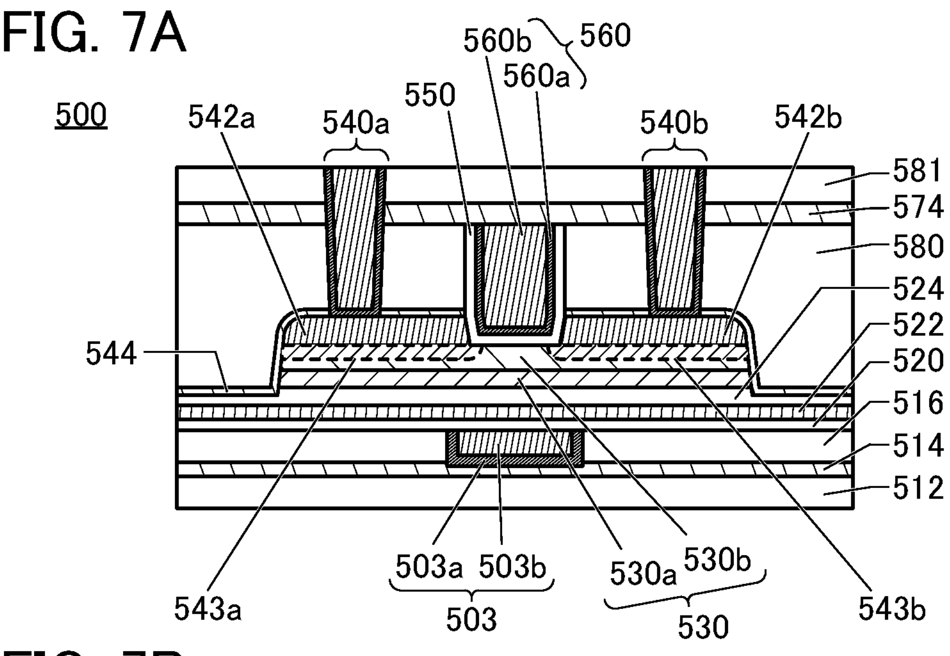
FIG. 7A is a cross-sectional view showing a transistor of one embodiment of the present invention.
Figure 7B:
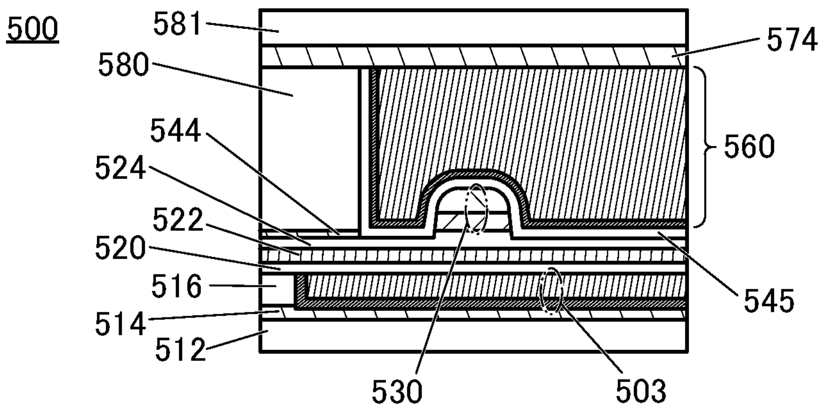
FIG. 7B is a cross-sectional view showing a transistor of one embodiment of the present invention.

The transistor 500 illustrated in FIG. 7A is a modification example of the transistor 500 illustrated in FIG. 2. FIG. 7A is a cross-sectional view of the transistor 500 in the channel length direction, and FIG. 7B is a cross-sectional view of the transistor 500 illustrated in FIG. 7A in the channel width direction.

The transistor 500 illustrated in FIG. 7A is different from the transistor 500 with the structure illustrated in FIG. 2A in that the oxide 530*c* is not provided. The insulator 550 is provided on the bottom and side surfaces of the opening portion of the insulator 580, which is formed between the conductor 542*a* and the conductor 542*b*, and a conductor 560 is provided on a surface where the insulator 550 is formed. Since the transistor 500 with the structure illustrated in FIG. 7A does not include the oxide 530*c*, parasitic capacitance between the oxide 530*c* and the conductor 560 with the insulator 550 therebetween can be eliminated.

This embodiment can be implemented in appropriate combination with the other embodiments.

Embodiment 3

Secondary batteries can be connected in series in order to increase the output voltage of a thin-film secondary battery. Embodiment 2 shows the example of a secondary battery having one cell; this embodiment will show an example of manufacturing a thin-film secondary battery in which a plurality of cells are connected in series.

Figures 8A, 8B:
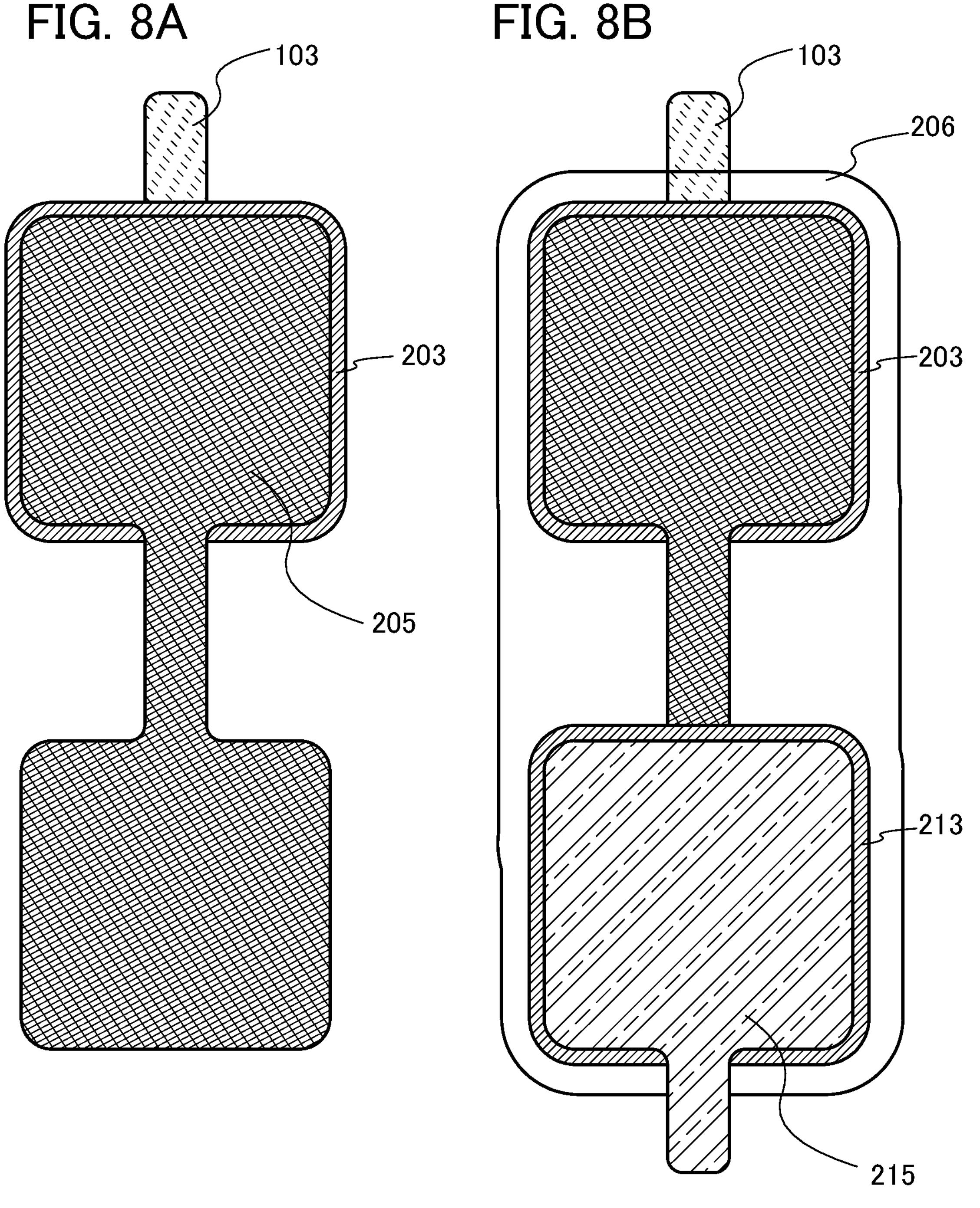
FIG. 8A is a top view of a secondary battery of one embodiment of the present invention.
FIG. 8B is a top view of a secondary battery of one embodiment of the present invention.

FIG. 8A is a top view right after formation of a first secondary battery, and FIG. 8B is a top view of two secondary batteries connected in series. In FIG. 8A and FIG. 8B, the same portions as the portions in FIG. 5A described in Embodiment 2 are denoted by the same reference numerals.

FIG. 8A illustrates the state right after formation of the negative electrode current collector 205. The shape of the top surface of the negative electrode current collector 205 is different from that in FIG. 5A. The negative electrode current collector 205 illustrated in FIG. 8A is partly in contact with a side surface of the solid electrolyte layer and is also in contact with an insulating surface of the substrate.

Then, as illustrated in FIG. 8B, a second negative electrode active material layer is formed over a region of the negative electrode current collector 205 that does not overlap the first negative electrode active material layer. Subsequently, a second solid electrolyte layer 213 is formed, and a second positive electrode active material layer and a second positive electrode current collector 215 are formed thereover. Finally, the protective layer 206 is formed.

FIG. 8B illustrates a structure in which two solid-state secondary batteries are arranged on a plane and connected in series.

This embodiment can be implemented in appropriate combination with the other embodiments.

Embodiment 4

In this embodiment, an example of a power storage device of one embodiment of the present invention will be described.

Example 1 of Power Storage Device

Figure 9:
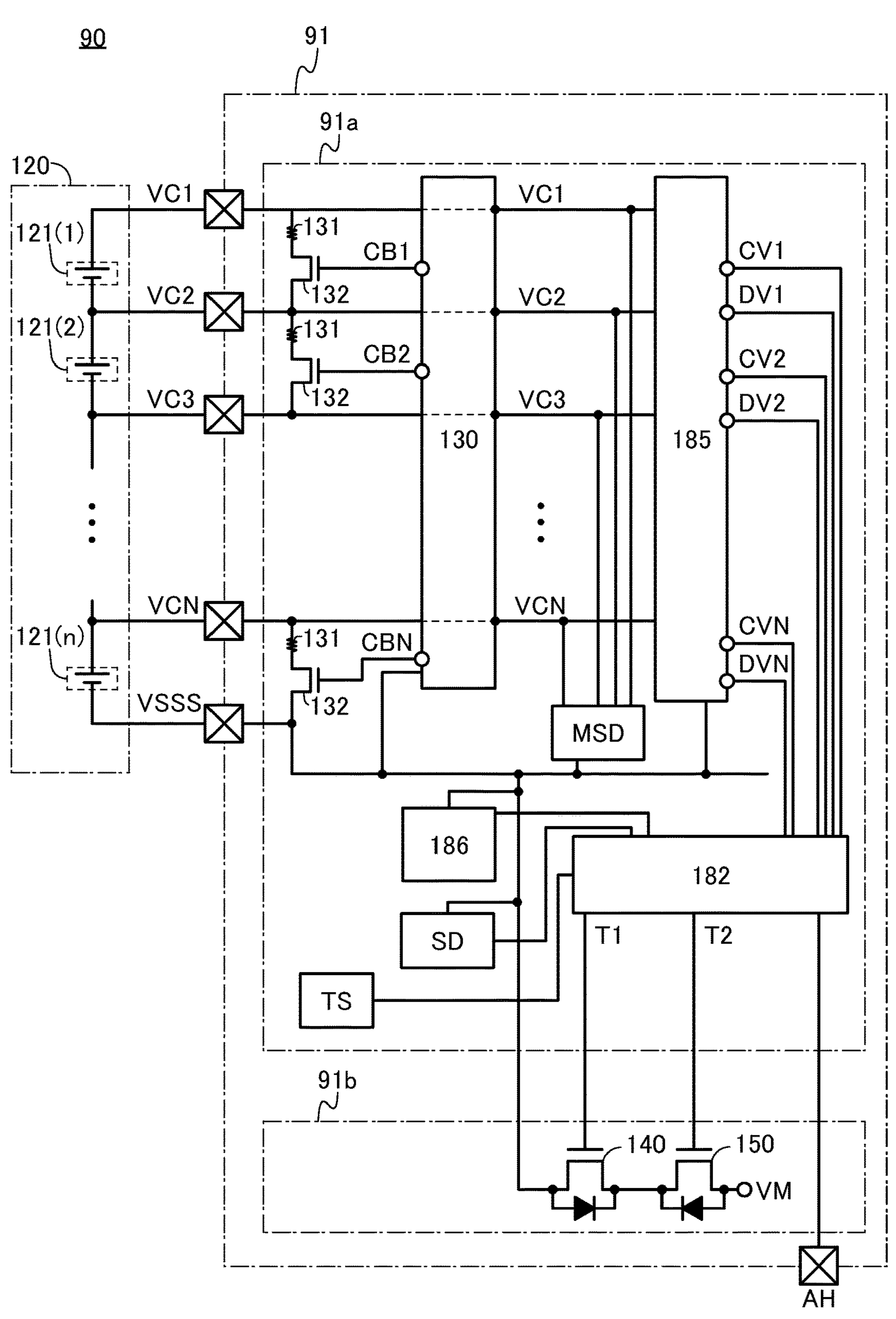
FIG. 9 is a block diagram illustrating one embodiment of the present invention.

FIG. 9 illustrates an example of a power storage device 90. The power storage device 90 illustrated in FIG. 9 includes a battery control circuit 91 and an assembled battery 120. The battery control circuit 91 preferably includes a circuit with the above-described OS transistor.

The battery control circuit 91 includes a circuit 91*a* and a circuit 91*b*.

The circuit 91*a* includes a cell balancing circuit 130, a detection circuit 185, a detection circuit 186, a detection circuit MSD, a detection circuit SD, a temperature sensor TS, and a logic circuit 182.

The circuit 91*b* includes a transistor 140 and a transistor 150. As the transistor 140 and the transistor 150, various transistors can be used. Note that each of the transistor 140 and the transistor 150 preferably includes a parasitic diode, as illustrated in FIG. 9.

OS transistors can be used as transistors included in the cell balancing circuit 130, the detection circuit 185, the detection circuit 186, the detection circuit MSD, the detection circuit SD, the temperature sensor TS, and the logic circuit 182, which are included in the circuit 91*a*.

An example in which transistors including single crystal silicon in a channel formation region are used as the transistor 140 and the transistor 150, which are included in the circuit 91*b*, is considered. In such a case, for example, the transistor 140 and the transistor 150 are formed on a silicon substrate, and the OS transistors can be formed thereover by a deposition process, whereby the circuit 91*a* and the circuit 91*b* can be formed over the same substrate. Consequently, costs can be reduced, for example. Furthermore, the circuit integration is achieved, so that the circuit area can be reduced. When the circuit 91*a* and the circuit 91*b* are stacked over the same substrate, resistance of led wirings can be reduced. The wiring resistance is preferably lowered because a large amount of current might flow through the transistor 140 and the transistor 150.

The assembled battery 120 includes a plurality of battery cells 121. FIG. 9 illustrates an example in which n battery cells 121 are included. A k-th battery cell (k is an integer greater than or equal to 1 and less than or equal to n) is represented by a battery cell 121(*k*) in some cases. The plurality of battery cells included in the assembled battery 120 are electrically connected in series. Although FIG. 9 illustrates an example in which the assembled battery 120 includes a plurality of battery cells 121 connected in series, the assembled battery 120 may include only one battery. Alternatively, the assembled battery 120 may include a plurality of batteries and the plurality of batteries may be connected in parallel.

Here, as the battery cell, a secondary battery shown in Embodiment described later can be used, for example. For example, a secondary battery including a wound battery element can be used. Furthermore, the battery cell preferably includes an exterior body. For example, a cylindrical exterior body, a rectangular exterior body, or the like can be used. As a material for the exterior body, a metal plate covered with an insulator, a metal film sandwiched between insulators, or the like can be used. The battery cell includes a set of positive and negative electrodes, for example. The battery cell may include a terminal electrically connected to the positive electrode and a terminal electrically connected to the negative electrode. In some cases, the battery cell includes some components of the battery management circuit of one embodiment of the present invention.

The cell balancing circuit 130 has a function of controlling charging of each battery cell 121 included in the assembled battery 120. The detection circuit 185 has a function of detecting overcharge and overdischarge of the assembled battery 120. The detection circuit 186 has a function of detecting discharge overcurrent and charge overcurrent of the assembled battery 120.

The detection circuit MSD has a function of detecting a micro-short circuit.

A micro-short circuit refers to a minute short circuit in a secondary battery, and is not a short circuit of a positive electrode and a negative electrode of a secondary battery which makes charge and discharge impossible but a phenomenon in which a short-circuit current flows through a minute short-circuit portion for a short period. A micro-short circuit is presumably caused in the following manner: a plurality of charges and discharges cause precipitation of a metal element such as lithium or cobalt in the battery, the growth of the precipitate causes a local current concentration in part of a positive electrode and part of a negative electrode, and the function of a separator partially stops or a by-product is generated.

The detection circuit SD detects a short circuit of a group of circuits that are operated with the use of the assembled battery 120, for example. Moreover, the detection circuit SD detects a charge current and a discharge current of the assembled battery 120, for example.

The battery control circuit 91 includes a terminal VC1 to a terminal VCN that are electrically connected to the respective positive electrodes of the n battery cells 121 included in the assembled battery 120, and a terminal VSSS electrically connected to the negative electrode of the n-th battery cell 121.

The logic circuit 182 has functions of controlling the transistor 140 and the transistor 150 in accordance with output signals from the detection circuit 185, the detection circuit 186, the detection circuit SD, the detection circuit MSD, and the temperature sensor TS. The logic circuit 182 may supply a signal to a charging circuit that is provided outside or inside the battery control circuit 91. In this case, the charging of a secondary battery is controlled in accordance with a signal supplied from the logic circuit 182 to the charging circuit, for example. Here, the charging circuit has a function of controlling the condition for charging a battery, for example. Alternatively, the charging circuit supplies a signal for controlling the condition for charging a battery to other circuits, such as the cell balancing circuit, the overcharge detection circuit, the transistor 140, the transistor 150, and the circuit controlling the transistor 140 and the transistor 150, which are included in one embodiment of the present invention.

The transistor 140 and the transistor 150 have a function of controlling charge or discharge of the assembled battery 120. For example, a conducting state or a non-conducting state of the transistor 140 is controlled by a control signal T1 supplied from the logic circuit 182, so that whether the assembled battery 120 is charged or not is controlled. A conducting state or a non-conducting state of the transistor 150 is controlled by a control signal T2 supplied from the logic circuit 182, so that whether the assembled battery 120 is discharged or not is controlled. In the example illustrated in FIG. 9, one of a source and a drain of the transistor 140 is electrically connected to the terminal VSSS. The other of the source and the drain the transistor 140 is electrically connected to one of a source and a drain of the transistor 150. The other of the source and the drain of the transistor 150 is electrically connected to a terminal VM. The terminal VM is electrically connected to a negative electrode of a charger, for example. The terminal VM is electrically connected to a load at the time of discharge, for example.

The battery control circuit 91 may have a function of observing a voltage value (a monitor voltage) of each of terminals of the battery cells 121 included in the assembled battery 120 and a current value (a monitor current) flowing through the assembled battery. For example, the on-state current of the transistor 140 or the transistor 150 may be observed as the monitor current. Alternatively, a resistor may be provided in series with the transistor 140 or the like, and the current value of the resistor may be observed.

The temperature sensor TS may have functions of measuring the temperature of the battery cell 121 and controlling charge and discharge of the battery cell in accordance with the measured temperature. For example, the resistance of a secondary battery may increase at low temperatures; thus, the charge current density and discharge current density are reduced in some cases. The resistance of a secondary battery may decrease at high temperatures; hence, the discharge current density is increased in some cases. When the increase in charge current at high temperatures causes a concern for deterioration of secondary battery characteristics, the charge current is controlled to be a current with which deterioration is suppressed, for example. Data on the charging condition, the discharging condition, and the like is preferably stored in a memory circuit or the like included in the battery control circuit 91 of one embodiment of the present invention. The temperature of the battery control circuit 91 or the assembled battery 120 is sometimes increased by charging. In such a case, charging is preferably controlled in accordance with the measured temperature. For example, the charge current is decreased along with the temperature increase.

The cell balancing circuit 130, the detection circuit 185, the detection circuit 186, the detection circuit MSD, the detection circuit SD, and the temperature sensor TS each preferably include a memory element. The memory element can retain, for example, an upper limit voltage, a lower limit voltage, a voltage in response to overcurrent, a voltage in response to temperature, or the like of the battery.

Figure 10A:
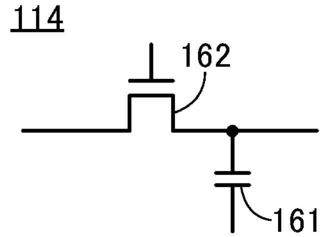
FIG. 10A is a circuit diagram illustrating one embodiment of the present invention.

The memory element can employ the structure of a memory element 114 illustrated in FIG. 10A. The memory element 114 illustrated in FIG. 10A includes a capacitor 161 and a transistor 162.

An OS transistor is preferably used as the transistor 162. In the structure of one embodiment of the present invention, with the use of the memory element 114 including the OS transistor, a desired voltage can be retained in the memory element by utilizing an extremely low leakage current flowing between a source and a drain when the transistor is off (hereinafter off-state current).

Figure 10B:
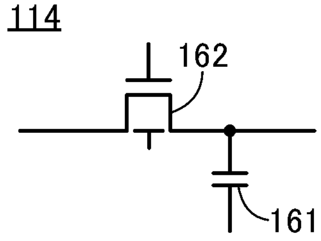
FIG. 10B is a circuit diagram illustrating one embodiment of the present invention.

FIG. 10B is different from FIG. 10A in that the transistor 162 included in the memory element 114 has a second gate. The second gate is sometimes referred to as a back gate or a bottom gate. The second gate included in the OS transistor will be described in detail in Embodiment below.

Next, components of the cell balancing circuit 130 and the detection circuit 185 are described.

Figure 11:
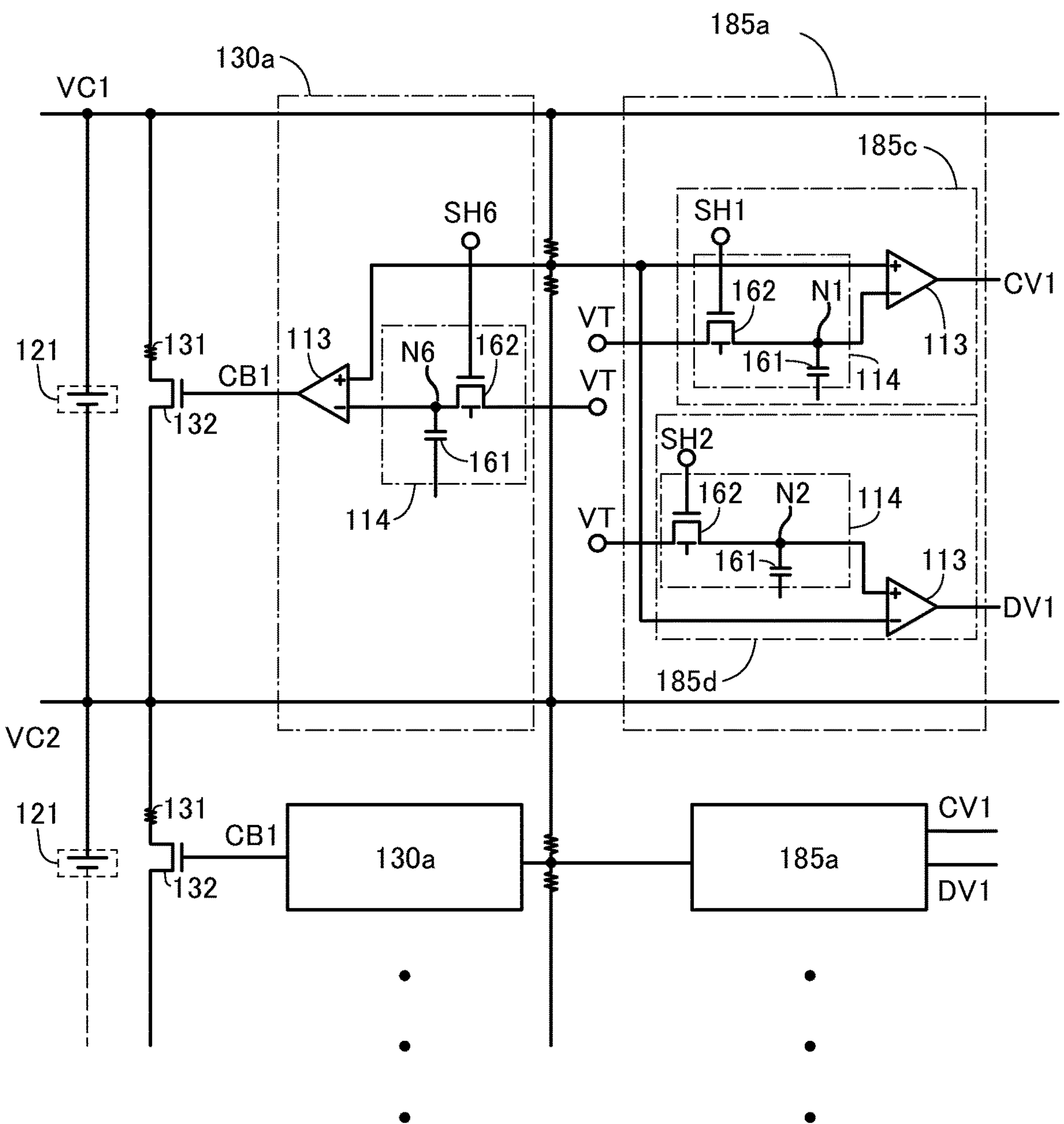
FIG. 11 is a block diagram illustrating one embodiment of the present invention.

FIG. 11 illustrates a cell balancing circuit 130*a* and a detection circuit 185*a* which correspond to one battery cell 121.

The cell balancing circuit 130 illustrated in FIG. 9 includes the plurality of cell balancing circuits 130*a*, and one cell balancing circuit 130*a* is connected to one battery cell. In the structure in which the plurality of battery cells 121 are connected in series, the cell balancing circuit 130*a* and a transistor 132 are provided for each battery cell 121 and the transistor 132 is directly connected to the cell balancing circuit 130*a*, inhibiting variations in charge voltages between the plurality of battery cells 121 connected in series when the battery cells 121 are charged.

The detection circuit 185*a* illustrated in FIG. 11 includes a circuit 185*c* and a circuit 185*d*. The detection circuit 185*c* has a function of detecting overcharge, and the detection circuit 185*d* has a function of detecting overdischarge.

The detection circuit 185 illustrated in FIG. 9 includes the plurality of detection circuits 185*a*, and one detection circuit 185*a* is connected to one battery cell. Alternatively, the detection circuit illustrated in FIG. 9 may include one detection circuit 185*a* with respect to the structure in which the plurality of battery cells 121 are connected in series.

In FIG. 11, a transistor 132 and a resistor 131 are connected in series, one of a source and a drain of the transistor 132 is electrically connected to the negative electrode of the battery cell 121, and the other thereof is electrically connected to one electrode of the resistor. The other electrode of the resistor is electrically connected to the positive electrode of the secondary battery.

Here, one of the source and the drain of the transistor 132 may be electrically connected to the positive electrode of the battery cell 121, the other thereof may be electrically connected to one electrode of the resistor 131, and the other electrode of the resistor 131 may be electrically connected to the negative electrode of the battery cell 121.

In FIG. 11, the cell balancing circuit 130*a*, the circuit 185*c*, and the circuit 185*d* each include a comparator 113 and the memory element 114. The memory element 114 includes the capacitor 161 and the transistor 162. In each of the comparators 113 included in the cell balancing circuit 130*a*, the circuit 185*c*, and the circuit 185*d*, one of a non-inverting input terminal and an inverting input terminal is electrically connected to the memory element 114. A common terminal, which corresponds to a terminal VT here, is electrically connected to one of a source and a drain of the transistor 162 included in the memory element 114. A terminal (a terminal SH6 in the cell balancing circuit a130, a terminal SH1 in the circuit 185*c*, and a terminal SH2 in the circuit 185*d*) is electrically connected to a gate of the transistor 162 included in the memory element 114.

In FIG. 11, the cell balancing circuit 130*a* is electrically connected to the positive electrode and the negative electrode of the battery cell 121. The positive electrode of the battery cell 121 is electrically connected to the terminal VC1, and the negative electrode thereof is electrically connected to the terminal VC2. In the cell balancing circuit 130*a*, the inverting input terminal of the comparator 113 is electrically connected to the other of the source and the drain of the transistor 162 included in the memory element 114. In the cell balancing circuit 130*a*, the non-inverting input terminal of the comparator 113 is preferably electrically connected to the terminal VC1. Alternatively, as illustrated in FIG. 11, the non-inverting input terminal of the comparator 113 may be supplied with a voltage that is divided by resistors between the terminal VC1 and the terminal VC2. In the cell balancing circuit 130*a*, a node connected to the other of the source and the drain of the transistor 162 included in the memory element 114 is referred to as a node N6.

In FIG. 11, the detection circuit 185*a* is electrically connected to the positive electrode and the negative electrode of the battery cell 121. In the circuit 185*c*, the inverting input terminal of the comparator is electrically connected to the other of the source and the drain of the transistor 162. In the circuit 185*c*, the non-inverting input terminal of the comparator 113 is preferably electrically connected to the terminal VC1. Alternatively, as illustrated in FIG. 11, the non-inverting input terminal of the comparator 113 may be supplied with a voltage that is divided by the resistors between the terminal VC1 and the terminal VC2. In the circuit 185*c*, a node connected to the other of the source and the drain of the transistor 162 is referred to as a node N1.

In the circuit 185*d*, the non-inverting input terminal of the comparator is electrically connected to the other of the source and the drain of the transistor 162. In the circuit 185*d*, the inverting input terminal of the comparator 113 is preferably electrically connected to the terminal VC1. Alternatively, as illustrated in FIG. 11, the inverting input terminal of the comparator 113 may be supplied with a voltage that is divided by the resistors between the terminal VC1 and the terminal VC2. In the circuit 185*d*, a node connected to the other of the source and the drain of the transistor 162 is referred to as a node N2.

In the cell balancing circuit 130*a* and the detection circuit 185*a*, a potential is retained at the node to which the other electrode of the capacitor 161 included in each circuit is connected (here, the node N6, the node N1, and the node N2) by turning off the transistor 162.

The terminal VT supplies analog signals sequentially to the cell balancing circuit 130*a*, the circuit 185*c*, and the circuit 185*d*. Analog signals are sequentially supplied to the node N6, the node N1, and the node N2 and retained. After an analog signal is supplied to the first node among the node N6, the node N1, and the node N2, the transistor 162 connected to the node is turned off, whereby the potential of the first node is retained. After that, a potential is supplied to the second node and retained, and then a potential of the third node is supplied and retained. The on/off state of the transistor 162 is controlled by signals supplied to the terminal SH1, the terminal SH2, and the terminal SH6).

The cell balancing circuit 130*a* and the detection circuit 185*a* illustrated in FIG. 11 are provided for each of the battery cells 121 included in the assembled battery 120, whereby a voltage difference between both ends (a voltage difference between the positive electrode and the negative electrode) can be controlled individually in each battery cell 121. The cell balancing circuit 130*a* for each battery cell 121 can make the memory element 114 retain a preferable value as a first upper limit voltage of the positive electrode.

The cell balancing circuit 130*a* controls whether the transistor 132 is turned on or turned off in accordance with the relation between the voltage of the positive electrode of the battery cell 121 and the voltage of the non-inverting input terminal of the comparator 113. The control of the transistor 132 can adjust the ratio between the amount of current flowing through the resistor 131 and the amount of current flowing through the battery cell 121. For example, to stop charging of the battery cell 121, a current is made to flow through the resistor 131 and a current flowing through the battery cell 121 is limited.

In FIG. 9, the plurality of battery cells 121 are electrically connected in series between a terminal VC1 and the terminal VSSS. By making a current flow between the terminal VC1 and the terminal VSSS, the plurality of battery cells 121 are charged.

The case where the positive electrode of one battery cell 121 among the plurality of battery cells 121 reaches a certain voltage and the current is limited is considered. In such a case, a current flows through the transistor 132 and the resistor 131 that are connected in parallel to the battery cell, whereby charge of the other battery cells 121 whose positive electrodes do not reach the certain voltage can be continued without interruption of a current path between the terminal VC1 and the terminal VSSS. In other words, in the battery cell 121 where the charge is completed, the charge is stopped by turning on the transistor 132; whereas in the battery cell 121 where the charge is not completed, the transistor 132 is turned off and the charge is continued.

In the case where the battery cells 121 have different resistances, for example, charge of a low-resistance battery cell 121 may be completed first, and charge of a battery cell 121 that has higher resistance than the low-resistance battery cell 121 may be insufficient. Here, insufficient charge means, for example, that the voltage difference between the positive electrode and the negative electrode is lower than a desired voltage. With the use of the cell balancing circuit 130, the voltage of the positive electrode of the battery cell 121 during charge can be controlled on the basis of the voltage of the negative electrode of the battery cell.

The cell balancing circuit of one embodiment of the present invention can control a charge voltage, a charge capacity, and the like of one battery cell or a plurality of battery cells without using a circuit provided outside the battery control circuit 91, for example, an arithmetic circuit such as an MPU or an MCU.

In other words, the use of the N cell balancing circuits 130*a* can reduce variations of states of the plurality of battery cells 121 after being charged, for example, when being fully charged. Thus, the capacity of the assembled battery 120 as a whole is increased in some cases. The increase in capacity can sometimes reduce the number of charge and discharge cycles of the battery cells 121, which may increase the durability of the assembled battery 120.

The circuit 185*c* for each battery cell 121 enables the memory element 114 to retain a second upper limit voltage of the positive electrode in charging of the battery cell 121. The second upper limit voltage is sometimes referred to as an overcharge voltage. The circuit 185*d* enables the memory element 114 to retain a lower limit voltage of the positive electrode in discharging. The lower limit voltage is sometimes referred to as an overdischarge voltage.

Note that the comparator included in the detection circuit 185 may be what is called a hysteresis comparator whose threshold is different between when the output is changed from the L level to the H level and when the output is changed from the H level to the L level. The memory element connected to a reference potential input portion of the hysteresis comparator preferably has a function of retaining two thresholds.

The detection circuit 185 can detect overcharge and overdischarge of one battery cell or a plurality of battery cells and protect the battery cell without using a circuit provided outside the battery control circuit 91, for example, an arithmetic circuit such as an MPU or an MCU. When a voltage decrease due to overdischarge is detected, the control circuit of one embodiment of the present invention interrupts a discharge current and prevents a voltage decrease. When interrupt of the discharge current is not sufficient, a leakage current might be generated and a voltage decrease might occur. The circuit configuration using power gating may inhibit a leakage current. Moreover, the circuit configuration using OS transistors may inhibit a leakage current.

The upper limit voltage of a battery cell is controlled by the cell balancing circuit connected to the battery cell and the circuit for detecting overcharge. An upper limit voltage detected by the cell balancing circuit is, for example, lower than an upper limit voltage detected by the circuit for detecting overcharge. Thus, in the process of charging, in a first step, the cell balancing circuit senses that the battery cell reaches the upper limit voltage, and changes the charging condition. Here, the charge current density is decreased, for example. Alternatively, discharging may be started. After that, owing to the increase in the charge voltage of the battery cell, when the circuit for detecting overcharge senses that the battery cell reaches the upper limit voltage, the charging condition of the battery cell is changed in a second step. Here, charging is stopped and discharging is started, for example.

<Other Components of Power Storage Device>

Examples of other components of the power storage device of one embodiment of the present invention will be described below.

The battery control circuit 91 includes a terminal group AH. The terminal group AH includes one terminal or a plurality of terminals.

As illustrated in FIG. 12, the terminal group AH is connected to the logic circuit 182. The terminal group AH preferably has a function of supplying a signal to the logic circuit 182 and a function of supplying a signal from the logic circuit 182 to a circuit provided outside the battery control circuit 91.

Figure 12A:
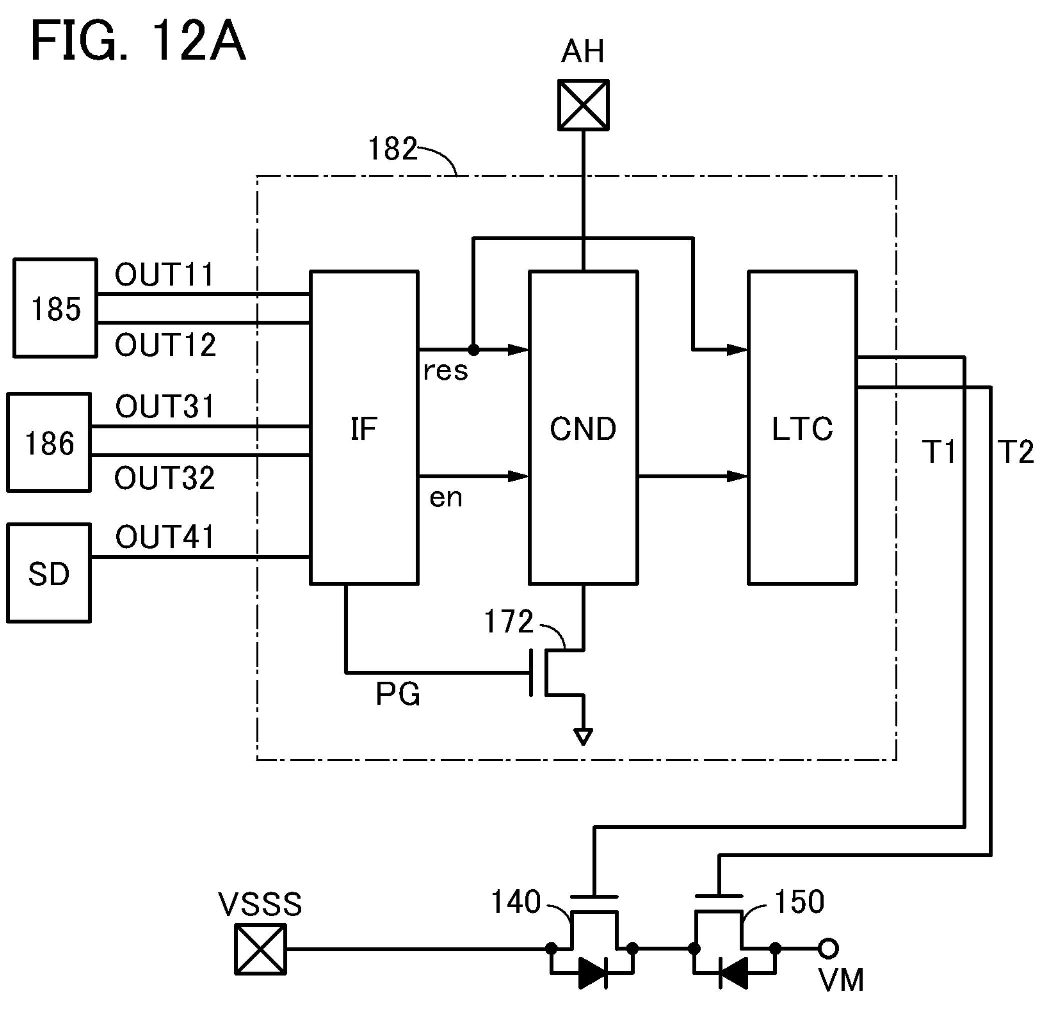
FIG. 12A is a block diagram illustrating one embodiment of the present invention.

FIG. 12A illustrates an example of the logic circuit 182. The logic circuit 182 illustrated in FIG. 12A includes an interface circuit IF, a counter circuit CND, a latch circuit LTC, and a transistor 172. An OS transistor is preferably used as the transistor 172. Note that the structure illustrated in FIG. 12A may be formed with only OS transistors included in the battery management circuit of one embodiment of the present invention, or part of the structure illustrated in FIG. 12A may be formed with the OS transistors included in the battery management circuit of one embodiment of the present invention. In the case where part of the structure illustrated in FIG. 12A is formed with the OS transistors included in the battery management circuit of one embodiment of the present invention, other part thereof is formed with transistors including single crystal silicon, for example.

The interface circuit IF is supplied with signals from an output terminal OUT11 and an output terminal OUT12 of the detection circuit 185, signals from an output terminal OUT31 and an output terminal OUT32 of the detection circuit 186, and a signal from an output terminal OUT41 of the detection circuit SD. The output terminal OUT11 supplies a signal corresponding to overcharge, for example. The output terminal OUT12 supplies a signal corresponding to overdischarge, for example. The output terminal OUT31 supplies a signal corresponding to overcurrent at charging, for example. The output terminal OUT32 supplies a signal corresponding to overcurrent at discharging, for example.

The interface circuit IF supplies a signal PG to a gate of the transistor 172 when detecting an abnormality detection signal, for example, a signal corresponding to at least one of overcharge, overdischarge, and overcurrent.

The transistor 172 is connected to the counter circuit CND.

The counter circuit CND operates a counter and a delay circuit when the signal PG is a signal for turning on the transistor 172, specifically, when a high-potential signal is output, for example. Meanwhile, the operation of the counter circuit CND can be stopped or the counter circuit CND can be set in a standby state when the signal PG is a signal for turning off the transistor 172, specifically, when a low-potential signal is output, for example. A signal res is supplied from the interface circuit IF to the counter circuit CND and the latch circuit LTC. The signal res is a reset signal. The counter circuit CND is supplied with the signal res and starts counting. A signal en is an enable signal. The counter circuit CND starts operating or stops operating according to the signal en.

When an abnormality detection signal is supplied to the interface circuit IF, the counter circuit CND counts for a predetermined period, and then a signal corresponding to the detected abnormality is supplied to the latch circuit LTC through the counter circuit CND.

The latch circuit LTC supplies the gate of the transistor 140 or the transistor 150 with a signal for turning off the transistor in accordance with the detected abnormality.

FIG. 13A illustrates an example of a circuit diagram of the detection circuit 186. The detection circuit 186 includes two comparators 113.

The memory element 114 in which a voltage corresponding to discharge overcurrent detection is retained is electrically connected to the non-inverting input terminal of one of the comparators 113. The terminal SH3 is electrically connected to the gate of the transistor included in the memory element 114. A terminal SENS is electrically connected to the inverting input terminal. When an overcurrent is detected from the voltage applied to the inverting input terminal, an output from the output terminal OUT32 is inverted.

The terminal SENS is electrically connected to the non-inverting input terminal of the other comparator 113. The memory element 114 retaining a voltage corresponding to charge overcurrent detection is electrically connected to the inverting input terminal. The terminal SH4 is electrically connected to the gate of the transistor included in the memory element 114. When an overcurrent is detected from the voltage applied to the non-inverting input terminal, an output from the output terminal OUT31 is inverted.

The temperature sensor TS has a function of measuring the temperature of the assembled battery 120 or the power storage device 90 including the assembled battery 120. FIG. 13B is a circuit diagram illustrating an example of the temperature sensor TS. Note that the circuit diagram in FIG. 13B may show some circuits of the temperature sensor TS.

The temperature sensor TS in FIG. 13B includes three comparators 113, and voltages VT (VT=Tm1, Tm2, Tm3) corresponding to different temperatures are applied to the inverting input terminals of the respective comparators. Each of the applied voltages VT is retained in the memory element 114 that is electrically connected to the inverting input terminal. The voltages Tm1, Tm2, and Tm3 may be applied from, for example, the battery control circuit 91.

A voltage corresponding to the measured temperature is applied to an input terminal Vt. The input terminal Vt is supplied to the non-inverting input terminal of each of the three comparators 113.

In accordance with the results of comparison of the voltage applied to the input terminal Vt with the voltage of the inverting input terminal of each of the comparators 113, signals are output from the output terminals (an output terminal OUT51, an output terminal OUT52, and an output terminal OUT53) of the comparators, whereby the temperature can be determined.

An OS transistor has a feature in that the resistance value becomes lower when the temperature rises. By utilizing this feature, the ambient temperature can be converted into a voltage. This voltage can be applied to the input terminal Vt, for example.

The logic circuit 182 may be configured to detect the output from the temperature sensor TS, and turn off the transistor 140 and (or) the transistor 150 to stop charging and (or) discharging when the temperature exceeds the temperature range in which the assembled battery 120 can operate.

<Battery Cell>

As the battery cell 121, the secondary battery 200 described in any of the above embodiments can be used.

<Transistor>

In the structure of one embodiment of the present invention, with the use of a memory element including an OS transistor, a reference voltage can be retained in the memory element by utilizing an extremely low leakage current flowing between a source and a drain when the transistor is off (hereinafter off-state current). At this time, the memory element can be powered off; thus, with the use of the memory element including the OS transistor, the reference voltage can be retained with extremely low power consumption.

The memory element including the OS transistor can retain an analog potential. For example, a voltage of a secondary battery can be retained in the memory element without being converted to a digital value with an analog-to-digital converter circuit. Since the converter circuit is unnecessary, the circuit area can be reduced.

In addition, the memory element with the OS transistor can rewrite and read the reference voltage by charging or discharging electric charge; thus, a substantially unlimited number of times of acquisition and reading of the monitor voltage is possible. The memory element with the OS transistor is superior in rewrite endurance because, unlike a magnetic memory or a resistive random-access memory, it does not go through atomic-level structure change. Furthermore, unlike in a flash memory, unstableness due to the increase of electron trap centers is not observed in the memory element with the OS transistor even when rewrite operation is repeated.

An OS transistor has features of an extremely low off-state current and favorable switching characteristics even in a high-temperature environment. Accordingly, charging or discharging of the assembled battery 120 can be controlled without a malfunction even in a high-temperature environment.

A memory element with an OS transistor can be freely placed by being stacked over a circuit with a Si transistor or the like, so that integration can be easy. Furthermore, an OS transistor can be manufactured with a manufacturing apparatus similar to that for a Si transistor and thus can be manufactured at low cost.

An OS transistor can be a four-terminal semiconductor element including a back gate electrode in addition to a gate electrode, a source electrode, and a drain electrode. An electric network where input and output of signals flowing between a source and a drain can be independently controlled in accordance with a voltage applied to a gate electrode or a back gate electrode can be constituted. Thus, circuit design with the same ideas as those of an LSI is possible. Furthermore, electrical characteristics of the OS transistor are better than those of a Si transistor in a high-temperature environment. Specifically, the ratio between on-state current and off-state current is large even at a high temperature higher than or equal to 100° C. and lower than or equal to 200° C., preferably higher than or equal to 125° C. and lower than or equal to 150° C.; hence, favorable switching operation can be performed.

An OS transistor is preferably used as the transistor 162. An OS transistor may be used as the transistor 132.

The comparator may be formed using OS transistors.

This embodiment can be combined with any of the other embodiments as appropriate.

Embodiment 5

In this embodiment, an example of a detection circuit included in the battery control circuit of one embodiment of the present invention will be described. The semiconductor device according to one embodiment of the present invention has a function of detecting a spontaneous potential change (here, potential decrease) due to a micro-short circuit in a secondary battery during charge and discharge by sampling (obtaining) a potential between the positive electrode and the negative electrode of the secondary battery at fixed intervals and comparing the sampled potential with a post-sampling potential between the positive electrode and the negative electrode. By repeating sampling at fixed intervals, the semiconductor device can deal with a potential change in the secondary battery during charge and discharge, and can be operated using the potential between the positive electrode and the negative electrode of the secondary battery.

Note that in this embodiment, potential changes in a secondary battery and a semiconductor device in the secondary battery during charging will be described with reference to a timing chart and the like. Potential changes during discharging will be easily understood by those skilled in the art, and therefore, the description thereof is omitted.

<Example of Detection Circuit>

Figure 14A:
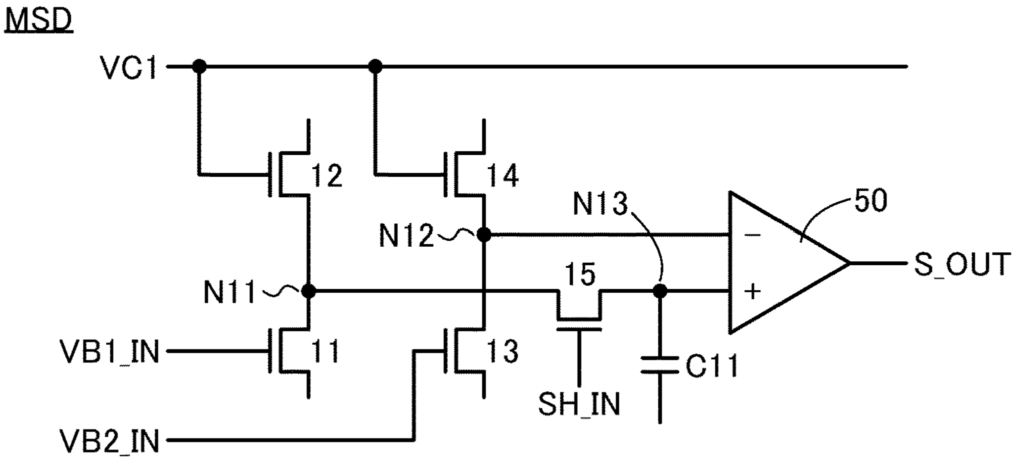
FIG. 14A is a circuit diagram illustrating one embodiment of the present invention.

FIG. 14A is a circuit diagram illustrating a structure example of the detection circuit MSD. The detection circuit MSD includes a transistor 11 to a transistor 15, a capacitor C11, and a comparator 50. Note that in the drawing described in this specification and the like, the flow of main signals is indicated by an arrow or a line, and a power supply line and the like are omitted in some cases. A hysteresis comparator may be used as the comparator 50 included in the detection circuit MSD. The detection circuit MSD may perform detection on a plurality of battery cells connected in series or perform detection on one battery cell at a time.

The detection circuit MSD illustrated in FIG. 14A includes the terminal VC1, a wiring VB1_IN supplied with a predetermined potential VB1, a wiring VB2_IN supplied with a predetermined potential VB2, a wiring SHIN supplied with a sampling signal, and an output terminal S_OUT.

Here, the predetermined potential VB1 is higher than the predetermined potential VB2, and the predetermined potential VB2 is higher than the potential of the terminal VSSS.

Figure 14B:
FIG. 14B is a circuit diagram illustrating one embodiment of the present invention.
Figure 14B:
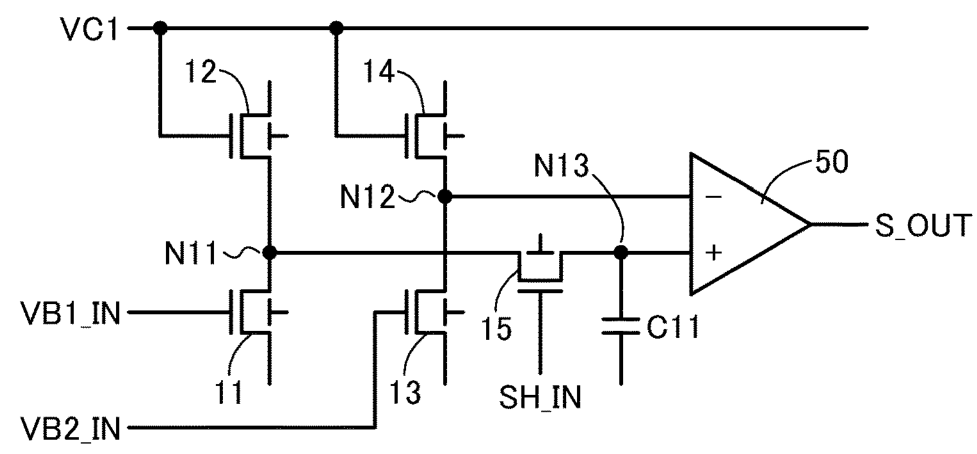

FIG. 14B differs from FIG. 14A in that the transistor 11 to the transistor 15 included in the detection circuit MSD each have a second gate.

Figure 14C:
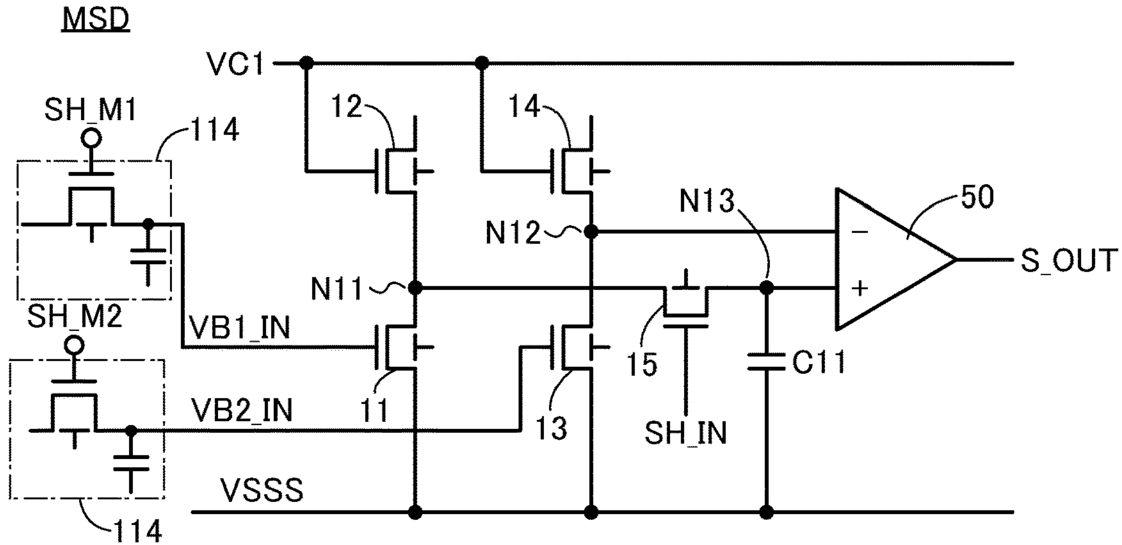
FIG. 14C is a circuit diagram illustrating one embodiment of the present invention.

FIG. 14C differs from FIG. 14B in including the terminal VSSS, including the memory element 114 connected to the wiring VB1_IN, and including the memory element 114 connected to the wiring VB2_IN. Moreover, in FIG. 14C, one of a source and a drain of the transistor 11, one of a source and a drain of the transistor 13, and one electrode of the capacitor C11 are electrically connected to the terminal VSSS. The potential VB1 and the potential VB2 are respectively supplied to the wiring VB1_IN and the wiring VB2_IN through the memory elements 114; thus, the supplied potentials can be retained by the memory elements 114. Consequently, a voltage generator circuit that supplies the potential VB1 and the potential VB2 can be powered off or set in a standby state.

The transistor 11 to the transistor 15 are n-channel transistors. Although an example in which the detection circuit MSD is formed using n-channel transistors is described in this specification and the like, p-channel transistors may alternatively be used. It will be easily understood by those skilled in the art that n-channel transistors in a circuit diagram configured using the n-channel transistors can be replaced with p-channel transistors; thus, the description is omitted.

In the detection circuit MSD, the one of the source and the drain of the transistor 11 is electrically connected to the terminal VSSS; the other of the source and the drain of the transistor 11 is electrically connected to one of a source and a drain of the transistor 12 and one of a source and a drain of the transistor 15; a gate of the transistor 11 is electrically connected to the wiring VB1_IN; and the other of the source and the drain of the transistor 12 and a gate of the transistor 12 are electrically connected to the terminal VC1.

One of the source and the drain of the transistor 13 is electrically connected to the terminal VSSS; the other of the source and the drain of the transistor 13 is electrically connected to one of a source and a drain of a transistor 14 and an inverting input terminal of the comparator 50; a gate of the transistor 13 is electrically connected to a wiring VB2_IN; and the other of the source and the drain of the transistor 14 and the gate of the transistor 14 is electrically connected to the terminal VC1.

The other of the source and the drain of the transistor 15 is electrically connected to the other terminal of the capacitor C11 and a non-inverting input terminal of the comparator 50; a gate of the transistor 15 is electrically connected to a wiring SH_IN; the one terminal of the capacitor C11 is electrically connected to the terminal VSSS; and an output terminal of the comparator 50 is electrically connected to an output terminal S_OUT. Note that the one terminal of the capacitor C11 may be electrically connected to a wiring other than the terminal VSSS as long as it is supplied with a predetermined potential.

Here, a connection portion where the other of the source and the drain of the transistor 11, the one of the source and the drain of the transistor 12, and the one of the source and the drain of the transistor 15 are electrically connected to each other is referred to as a node N11; a connection portion where the other of the source and the drain of the transistor 13, the one of the source and the drain of the transistor 14, and the inverting input terminal of the comparator 50 are electrically connected to each other is referred to as a node N12; and a connection portion where the other of the source and the drain of the transistor 15, the other terminal of the capacitor C11, and the non-inverting input terminal of the comparator 50 are electrically connected to each other is referred to as a node N13.

The transistor 11 and the transistor 12 form a first source follower, and the transistor 13 and the transistor 14 form a second source follower. That is, the gate of the transistor 11 corresponds to an input of the first source follower, and the first source follower outputs a signal to the node N11. The gate of the transistor 13 corresponds to an input of the second source follower, and the second source follower outputs a signal to the node N12.

An example of the operation of the detection circuit MSD is described using the circuit illustrated in FIG. 14C.

When charging is started in an assembled battery, the sampling signal supplied to the wiring SH_IN becomes high level at predetermined intervals. As the potential VB1, a potential higher than the potential VB2 is supplied. The potential of the node N11 and the potential of the node N12 increase along with charging.

When the positive electrode potential decreases instantaneously because of occurrence of a micro-short circuit, the potentials of the node N11 and the node N12 decrease instantaneously. Meanwhile, when the sampling signal supplied to the wiring SH_IN is at low level, the potential of the node N13 is not affected by the potential of the node N11, and the potential of the node N12 becomes lower than the potential of the node N13. Then, the output of the comparator 50 is inverted, and a micro-short circuit is detected.

To increase the accuracy of detecting a micro-short circuit, a micro-short circuit may be detected or predicted in such a manner that the voltage of a secondary battery is converted into digital data by an analog-to-digital converter circuit, and arithmetic operation is performed on the basis of the digital data by a processor unit or the like to analyze a charge waveform or a discharge waveform. For example, a micro-short circuit is detected or predicted using a change of a voltage difference between time steps in the charge waveform or the discharge waveform. A change of a voltage difference is obtained by calculating voltage differences and calculating a difference with the previous step.

A neural network may be used to increase the accuracy of detecting a micro-short circuit.

A neural network is a method and is neural network processing performed in a neural network portion (including a CPU (Central Processor Unit), a GPU (Graphics Processing Unit), an APU (Accelerated Processing Unit), a memory, and the like, for example). Note that an APU refers to a chip integrating a CPU and a GPU into one.

In a secondary battery mounted on a device, discharge, which is likely to depend on a way of using the device by the user, occurs at random; whereas a charge curve can be said to be more easily predicted than a discharge curve because the charging condition is fixed. Using a rather large number of charge curves as data for learning, an accurate value can be predicted with a neural network. When a charge curve is obtained, SOC (State of charge) and the like can be obtained using a neural network. For arithmetic operation of a neural network, a microprocessor or the like can be used, for example.

Specifically, a variety of obtained data are evaluated and learned using machine learning or artificial intelligence to analyze the expected degree of degradation of a secondary battery, and when there is an abnormality, charging of the secondary battery is stopped or the current density of constant-current charging is adjusted.

For example, in an electric vehicle, learning data can be obtained while the electric vehicle is running, and the degradation state of a secondary battery can be known. Note that a neural network is used to estimate the degradation state of the secondary battery. The neural network can be formed of a neural network including a plurality of hidden layers, that is, a deep neural network. Note that learning in a deep neural network is referred to as deep learning in some cases.

In machine learning, first, a feature value is extracted from learning data. A relative change amount that changes with time is extracted as a feature value, and a neural network is made to learn based on the extracted feature value. For the learning means, the neural network can be made to learn based on learning patterns that are different between each time division. A coupling weight applied to the neural network can be updated according to a leaning result based on the leaning data.

As a method of estimating the charging state of a secondary battery by using a neural network, a regression model such as a Kalman filter, for example, can be used for calculation processing.

A Kalman filter is a kind of infinite impulse response filter. Multiple regression analysis is multivariate analysis and uses a plurality of independent variables in regression analysis. Examples of the multiple regression analysis include a least-squares method. The regression analysis requires a large number of observation values of time series, whereas the Kalman filter has an advantage of being able to obtain an optimal correction coefficient successively as long as a certain amount of data is accumulated. Moreover, the Kalman filter can also be applied to transient time series.

As a method of estimating the internal resistance and the state of charge (SOC) of a secondary battery, a non-linear Kalman filter (specifically an unscented Kalman filter (also referred to as UKF)) can be used. In addition, an extended Kalman filter (also referred to as EKF) can also be used. The SOC refers to a charging state (also referred to as state of charge), and is an index indicating that the fully charged state is 100% and the completely discharged state is 0%.

Initial parameters obtained by an optimization algorithm are collected in every n (n is an integer, e.g., 50) cycles, and neural network processing is performed using these data groups as teacher data; thus, the SOC can be estimated with high accuracy.

A leaning system includes a teacher data generation device and a learning device. The teacher data generation device generates teacher data that the learning device uses for learning. Teacher data includes data whose recognition target is the same as that of process target data, and the evaluation of a label corresponding to the data. The teacher data generation device includes an input data acquisition portion, an evaluation acquisition portion, and a teacher data generation portion. The input data acquisition portion may obtain input data from data stored in a memory device or obtain input data for learning via the Internet; input data is data used for learning and includes a current value and a voltage value of a secondary battery. Teacher data is not necessarily measured data; data close to actual measurement may be created by varying initial parameters to increase the diversity, and neural network processing may be performed using a predetermined property database as teacher data to estimate the state of charge (SOC). Alternatively, data close to actual measurement can be created on the basis of charge and discharge characteristics of one battery, and neural network processing can be performed using a predetermined property database as teacher data to efficiently estimate the SOC of batteries of the same kind.

In the case where degradation of a secondary battery proceeds, an SOC error might occur when FCC, the initial parameter, changes greatly; hence, initial parameters used for arithmetic operation to estimate the SOC may be updated. The initial parameters to be updated are calculated by an optimization algorithm using data on charge and discharge characteristics that are measured in advance. By calculation processing with a regression model using updated initial parameters, for example, a Kalman filter, the SOC can be estimated with high accuracy even after degradation. In this specification, calculation processing using a Kalman filter is also expressed as Kalman filter processing.

The timing of updating the initial parameters can be at random; to estimate the SOC with high accuracy, the frequency of updates is preferably high and successive updates at regular intervals are preferable. Note that when the temperature of a secondary battery is high and its SOC is high, degradation of the secondary battery is likely to progress in some cases. In such a case, it is preferable to inhibit degradation of the secondary battery by discharging the secondary battery to lower the SOC.

This embodiment can be combined with any of the other embodiments as appropriate.

Embodiment 6

This embodiment will describe a structure example of a comparator.

Figure 15A:
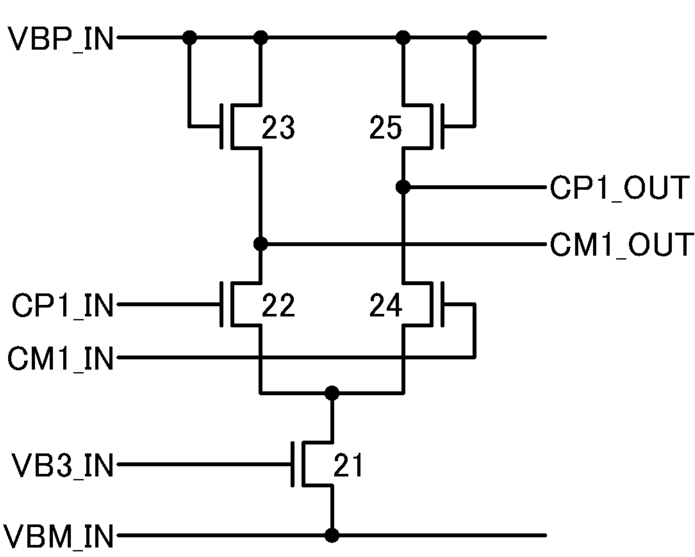
FIG. 15A is a circuit diagram illustrating one embodiment of the present invention.

FIG. 15A illustrates a structure example of the comparator 50 described in the foregoing embodiment. The comparator 50 includes a transistor 21 to a transistor 25. The comparator 50 also includes a wiring VBM_IN supplied with a negative electrode potential of a secondary battery, a wiring VBP_IN supplied with a positive electrode potential VBP of the secondary battery, a wiring VB3_IN supplied with a predetermined potential VB3, an input terminal CP1_IN, an input terminal CM1_IN, an output terminal CP1_OUT, and an output terminal CM1_OUT.

In the case where the comparator 50 in FIG. 15A is used in the cell balancing circuit 130 and the detection circuit 185, potentials are connected from the terminal VC1 to the wiring VBP_IN and from the terminal VC2 to the wiring VBM_IN, for example.

Here, the predetermined potential VB3 is higher than a negative electrode potential VBM, and in the comparator 50, the positive electrode potential VBP is a high power supply potential and the negative electrode potential VBM is a low power supply potential.

In the comparator 50, one of a source and a drain of the transistor 21 is electrically connected to the wiring VBM_IN; the other of the source and the drain of the transistor 21 is electrically connected to one of a source and a drain of the transistor 22 and one of a source and a drain of the transistor 24; and a gate of the transistor 21 is electrically connected to the wiring VB3_IN.

The other of the source and the drain of the transistor 22 is electrically connected to one of a source and a drain of the transistor 23 and the output terminal CM1_OUT; the other of the source and the drain of the transistor 23 and a gate of the transistor 23 are electrically connected to the wiring VBP_IN; and a gate of the transistor 22 is electrically connected to the input terminal CP1_IN.

The other of the source and the drain of the transistor 24 is electrically connected to one of a source and a drain of the transistor 25 and the output terminal CP1_OUT; the other of the source and the drain of the transistor 25 and a gate of the transistor 25 are electrically connected to the wiring VBP_IN; and a gate of the transistor 24 is electrically connected to the input terminal CM1_IN.

Alternatively, a plurality of circuits in FIG. 15A may be connected in parallel and used as the comparator 50. That is, the output of the comparator illustrated in FIG. 15A may be input to a next-stage comparator 50, and a plurality of comparators may be connected and used.

Figure 15B:
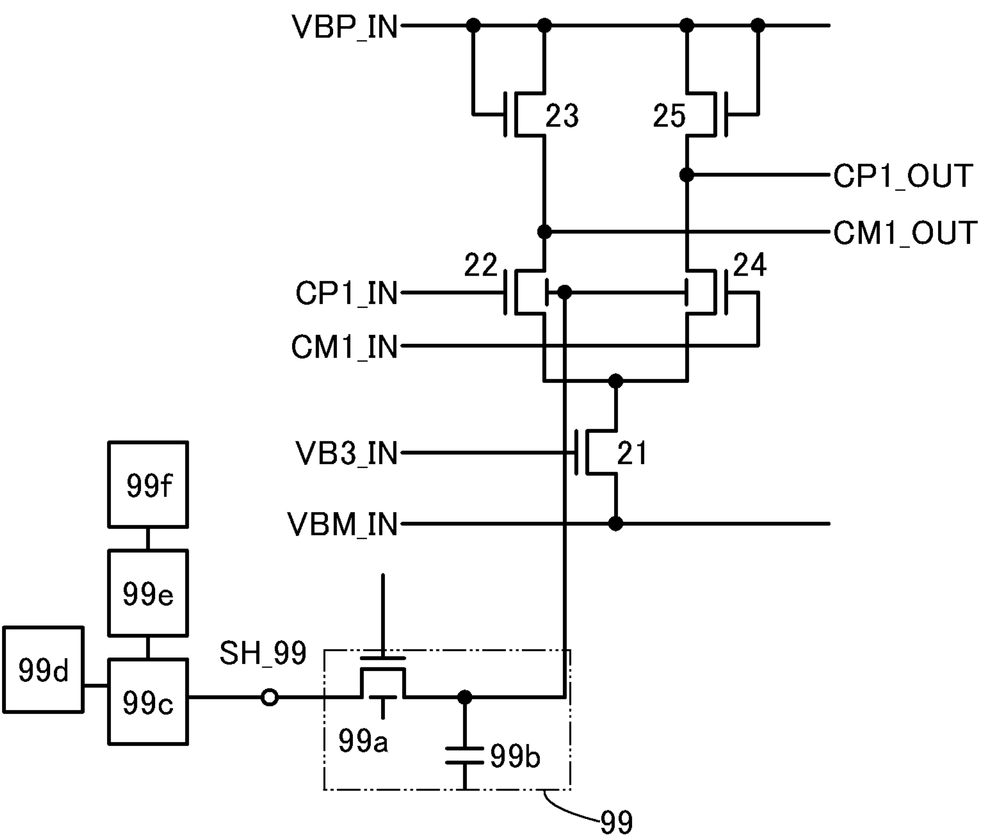
FIG. 15B is a circuit diagram illustrating one embodiment of the present invention.

Note that the transistor included in the circuit shown in FIG. 15A may have a back gate, as shown in FIG. 15B. A retention circuit 99 may apply a voltage to the back gate to be retained. In the retention circuit 99, one of a source and a drain of the transistor 99*a* is electrically connected to a terminal SH_99, and the other of the source and the drain of the transistor 99*a* is electrically connected to a back gate of the transistor 22, a back gate of the transistor 24, and one electrode of a capacitor 99*b*.

In the retention circuit 99, a voltage applied to the back gate is applied to the terminal SH_99, and with the transistor 99*a* being in an on state, the voltage is applied to the back gates of the transistor 22 and the transistor 24. Then, the transistor 99*a* is turned off, whereby the voltage of the back gate can be retained. When an OS transistor is used as the transistor 99*a*, leakage current flowing between a source and a drain in an off state (hereinafter such current is referred to as an off-state current) is extremely low; thus, a desired voltage can be retained in the back gates of the transistor 22 and the transistor 24.

The voltage applied to the terminal SH_99 is, for example, applied from a secondary battery 99*f* to a converter circuit 99*e*, and after going through the converter circuit 99*e*, applied to a booster circuit 99*c* to be boosted in the booster circuit 99*c*, and then applied to the terminal SH_99. A signal from a clock generation circuit 99*d* is supplied to the booster circuit 99*c*. OS transistors can be used to form the converter circuit 99*e*, the booster circuit 99*c*, and the clock generation circuit 99*d*.

In the power storage device of one embodiment of the present invention, two or more secondary batteries may be provided over the substrate. For example, the secondary battery 99*f* may be provided, in addition to the secondary battery for sharing electric power from the power storage device with an electronic device or the like described later (here, such secondary battery is referred to as a primary secondary battery). In such a case, the secondary battery 99*f* may be smaller in capacity than the primary secondary battery, e.g., 0.1 times or less or 0.01 times or less.

Figure 12B:
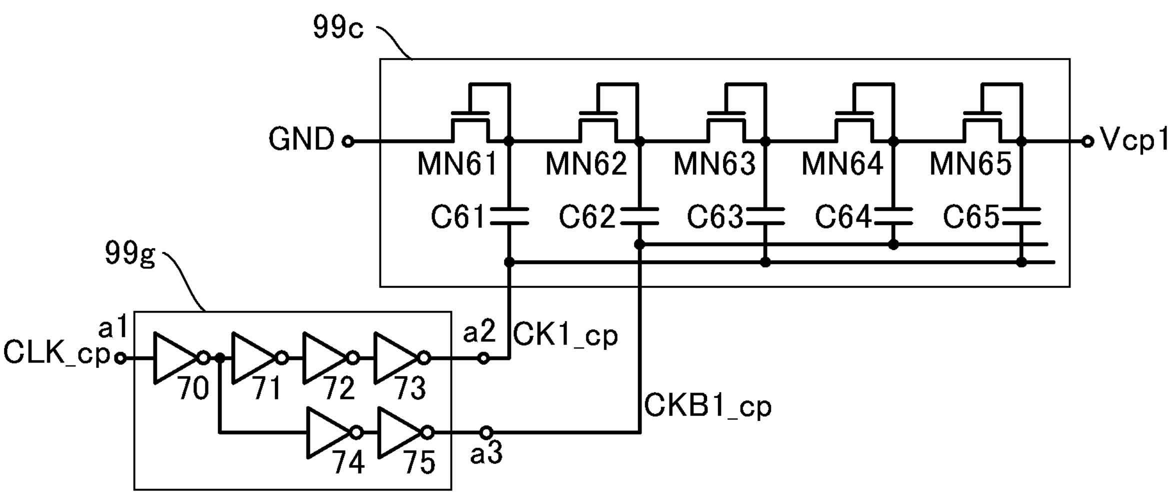
FIG. 12B is a circuit diagram illustrating one embodiment of the present invention.

FIG. 12B shows an example of a structure of a clock buffer circuit 99*g* to which signals from the booster circuit 99*c* and the clock generation circuit 99*d* are supplied.

(Clock Buffer Circuit)

The clock buffer circuit 99*g* includes inverters 70 to 75 and terminals a1 to a3. The clock buffer circuit 99*g* has a function of generating signals CK1_*cp* and CKB1_*cp* from a signal CLK_cp. A terminal a1 is an input terminal for the signal CLK_cp, and terminals a2 and a3 are output terminals for the signals CK1_*cp* and CKB1_*cp*, respectively. The signal CLK_cp is a clock signal. The power storage device of one embodiment of the present invention may have a function of dividing a reference clock signal and generating the signal CLK_cp. The signal CK1_*cp* and the signal CKB1_*cp* are complementary clock signals.

(Booster Circuit)

The booster circuit 99*c* is a step-down charge pump and has a function of generating a potential Vcp1 by lowering the pressure of the potential GND. Note that the input potential is not limited to the potential GND. The booster circuit 99*c* includes transistors MN61 to MN65 and capacitors C61 to C65. The number of stages of the booster circuit 99*c* is five but is not limited thereto.

This embodiment can be combined with the description of the other embodiments as appropriate.

Embodiment 7

In this embodiment, examples of electronic devices including a power storage device of one embodiment of the present invention will be described with reference to FIG. 16 and FIG. 17A to FIG. 17C. Since the power storage device of one embodiment of the present invention can be provided over the same substrate as a secondary battery and a battery control circuit, it is possible to reduce the size of electronic devices and to improve the safety of the secondary battery. In addition, the power storage device of one embodiment of the present invention is characterized by being thin because it can be provided over a substrate.

Figure 16:
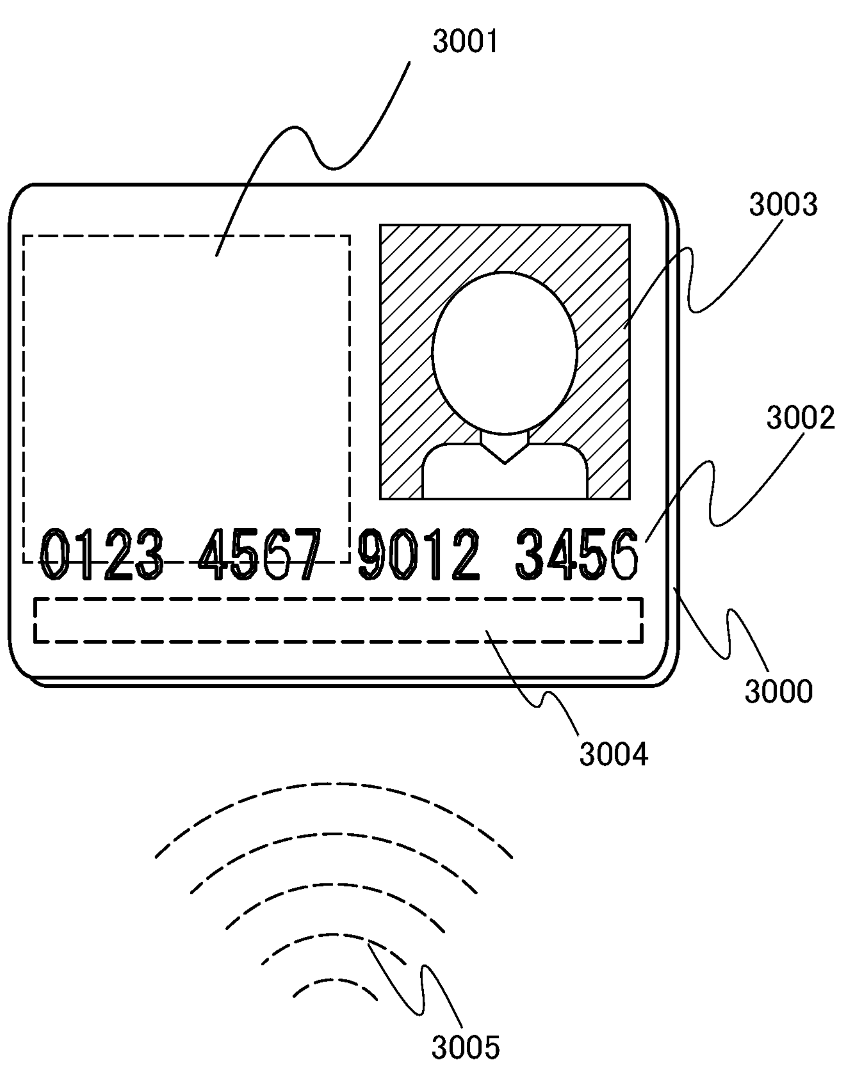
FIG. 16 is a diagram illustrating an example of an electronic device.

FIG. 16 shows an IC card, which is an example of applied equipment including the power storage device of one embodiment of the present invention. A thin-film-type secondary battery 3001 included in the power storage device can be charged with electric power obtained by power feeding from a radio wave 3005. An antenna, an IC 3004, and the thin-film-type secondary battery 3001 are provided inside an IC card 3000. An ID 3002 and a photograph 3003 of a worker who wears the management badge are displayed on the IC card 3000. A signal such as an authentication signal can be transmitted from the antenna using the electric power charged in the thin-film-type secondary battery 3001.

The power storage device of one embodiment of the present invention may include a display device for displaying the ID 3002 and the photograph 3003. The display device includes, for example, a display portion and a driver circuit for supplying an image signal to the display portion. The driver circuit can include a plurality of OS transistors described in the above embodiment, for example. In the power storage device of one embodiment of the present invention, the secondary battery and the OS transistors can be provided over the same substrate. In this manner, providing the driver circuit including the OS transistors enables the secondary battery and the driver circuit or at least part of the driver circuit to be provided over the same substrate. Thus, a thinner, lighter, and more robust IC card becomes possible, for example.

As the display device, an active matrix display device may be provided, for example. Examples of the active matrix display device include a reflective liquid crystal display device, an organic EL display device, and electronic paper. An image (a moving image or a still image) or the time can be displayed on the active matrix display device. Electric power for the active matrix display device can be supplied from the thin-film-type secondary battery 3001.

A plastic substrate is used for the IC card, and thus an organic EL display device with a flexible substrate is preferable.

A solar cell may be provided instead of the photograph 3003. By irradiation with external light, light can be absorbed to generate electric power, and the thin-film-type secondary battery 3001 can be charged with the electric power.

Without limitation to the IC card, the thin-film-type secondary battery can be used for a power source of an in-vehicle wireless sensor, a secondary battery for a MEMS device, and the like.

Figure 17A:
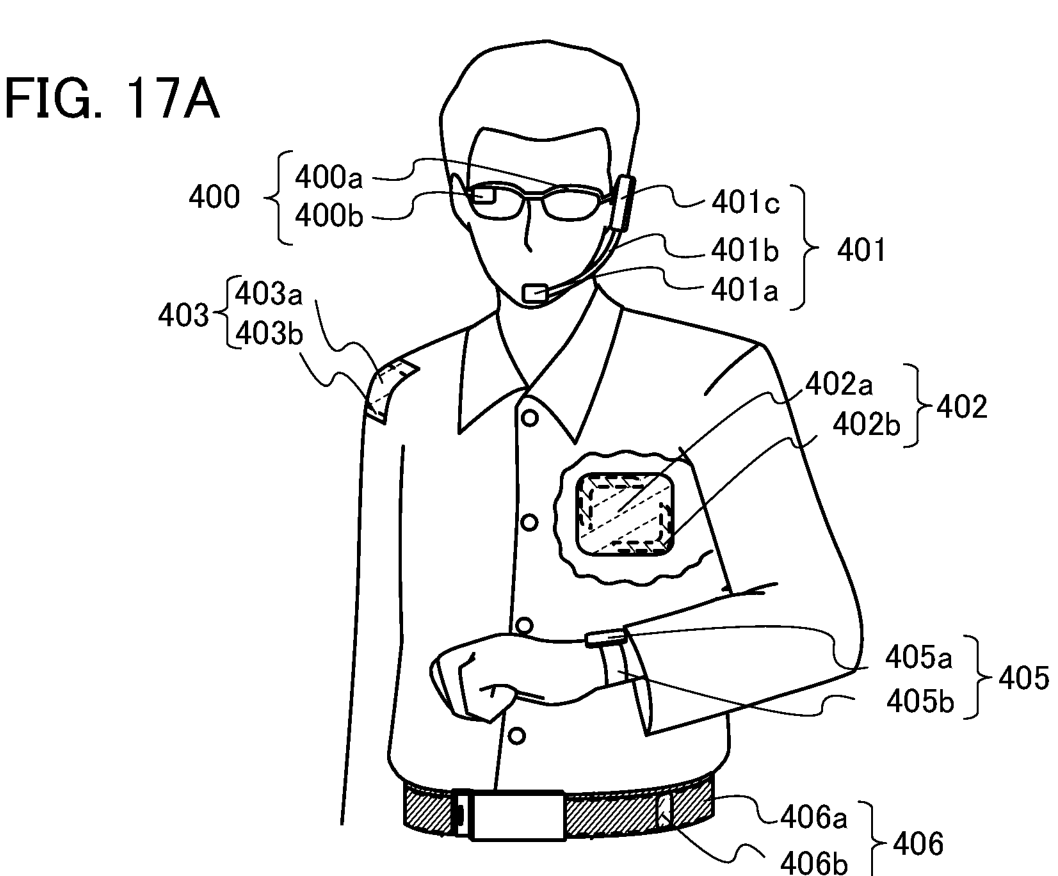
FIG. 17A is a diagram illustrating an example of an electronic device.

FIG. 17A illustrates examples of wearable devices. A secondary battery is used as a power source of a wearable device. To have improved splash resistance, water resistance, or dust resistance in daily use or outdoor use by a user, a wearable device is desirably capable of being charged wirelessly as well as being charged with a wire whose connector portion for connection is exposed.

For example, the power storage device of one embodiment of the present invention can be incorporated in a glasses-type device 400 illustrated in FIG. 17A. The glasses-type device 400 includes a frame 400*a* and a display portion 400*b*. The power storage device including the secondary battery is incorporated in a temple of the frame 400*a* having a curved shape, whereby the glasses-type device 400 can be lightweight, have a well-balanced weight, and be used continuously for a long time. The use of the secondary battery of one embodiment of the present invention enables a structure that accommodates space saving due to downsizing of the housing.

The secondary battery of one embodiment of the present invention can be incorporated in a headset-type device 401. The headset-type device 401 includes at least a microphone portion 401*a*, a flexible pipe 401*b*, and an earphone portion 401*c*. The secondary battery can be provided in the flexible pipe 401*b* or the earphone portion 401*c*. The use of the secondary battery of one embodiment of the present invention enables a structure that accommodates space saving due to downsizing of the housing.

The secondary battery of one embodiment of the present invention can be incorporated in a device 402 that can be directly attached to a human body. A power storage device 402*b* including a secondary battery can be provided in a thin housing 402*a* of the device 402. The use of the secondary battery of one embodiment of the present invention enables a structure that accommodates space saving due to downsizing of the housing.

The power storage device of one embodiment of the present invention can be incorporated in a device 403 that can be attached to clothing. A power storage device 403*b* including a secondary battery can be provided in a thin housing 403*a* of the device 403. The use of the secondary battery of one embodiment of the present invention enables a structure that accommodates space saving due to downsizing of the housing.

The power storage device of one embodiment of the present invention can be incorporated in a belt-type device 406. The belt-type device 406 includes a belt portion 406*a* and a wireless power feeding and receiving portion 406*b*, and the power storage device including a secondary battery can be incorporated in the belt portion 406*a*. The use of the power storage device of one embodiment of the present invention enables a structure that accommodates space saving due to downsizing of the housing.

The power storage device of one embodiment of the present invention can be incorporated in a watch-type device 405. The watch-type device 405 includes a display portion 405*a* and a belt portion 405*b*, and the power storage device can be provided in the display portion 405*a* or the belt portion 405*b*. The use of the power storage device of one embodiment of the present invention enables a structure that accommodates space saving due to downsizing of the housing.

The display portion 405*a* can display various kinds of information such as reception information of an e-mail or an incoming call in addition to time.

Since the watch-type device 405 is a type of wearable device that is directly wrapped around an arm, a sensor that measures pulse, blood pressure, or the like of a user can be incorporated therein. Data on the exercise quantity and health of the user can be stored and used for health maintenance.

Figure 17B:
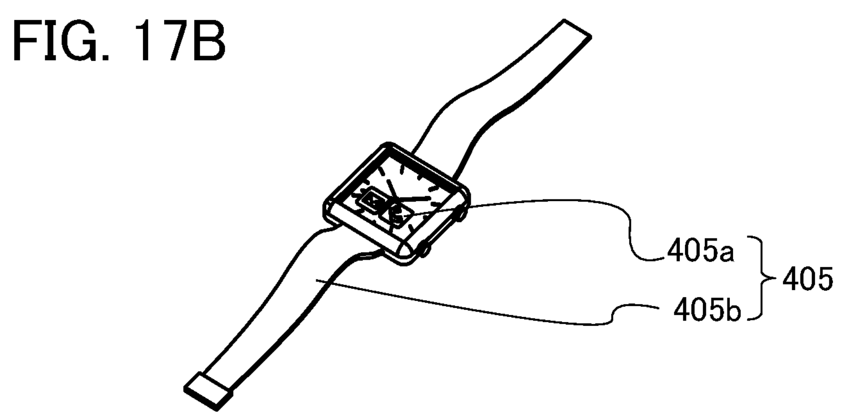
FIG. 17B is a diagram illustrating an example of an electronic device.

FIG. 17B is a perspective view of the watch-type device 405 that is detached from an arm.

Figure 17C:
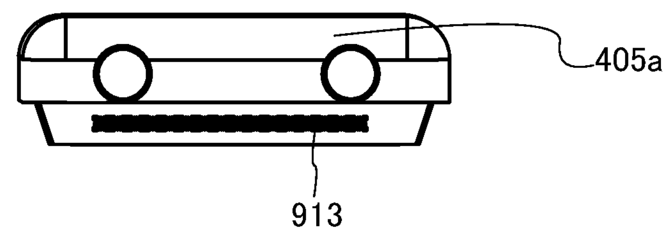
FIG. 17C is a diagram illustrating an example of an electronic device.

FIG. 17C is a side view. FIG. 17C illustrates a state where a power storage device 913 including a secondary battery is incorporated inside. The power storage device 913 is provided at a position overlapped by the display portion 405*a* and is small and lightweight.

This embodiment can be implemented in appropriate combination with the other embodiments.

Embodiment 8

In this embodiment, electronic devices including the power storage device of one embodiment of the present invention will be described with reference to FIG. 18A and FIG. 18B and FIG. 19A to FIG. 19D. Since the power storage device of one embodiment of the present invention can be provided over the same substrate as a secondary battery and a battery control circuit, it is possible to reduce the size of electronic devices and to improve the safety of the secondary battery. In addition, the power storage device of one embodiment of the present invention is characterized by being thin because it can be provided over a substrate.

Figure 18A:
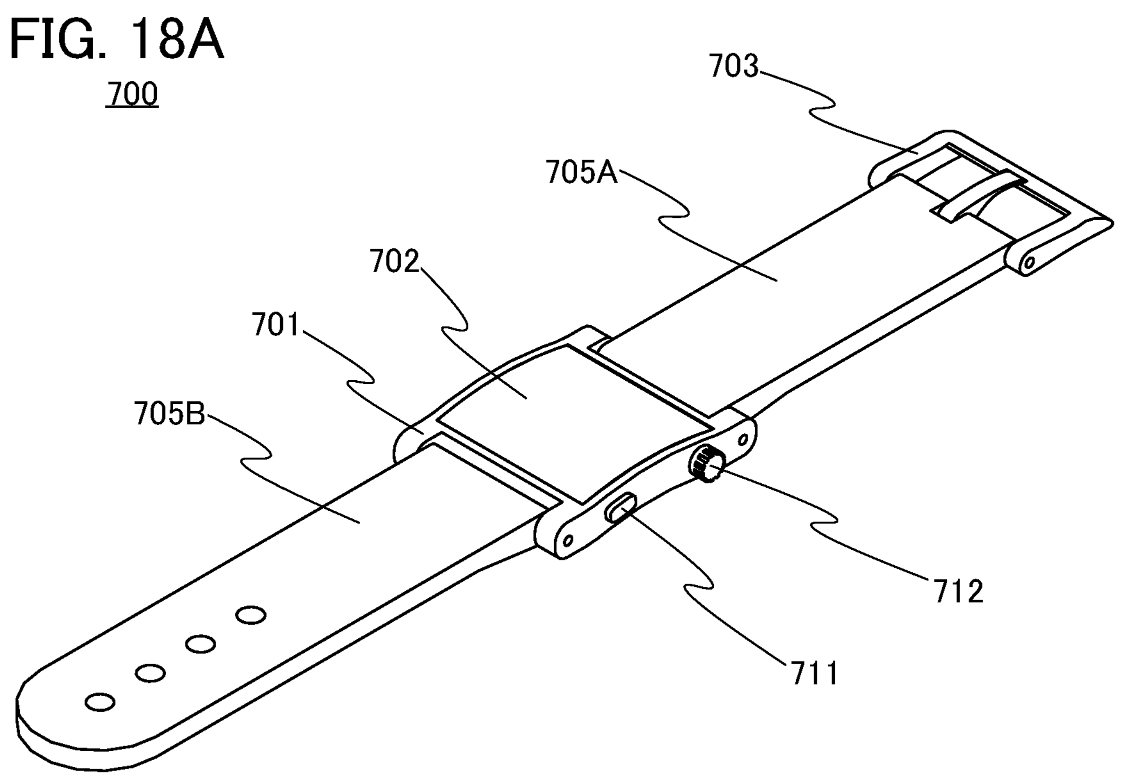
FIG. 18A is a diagram illustrating an example of an electronic device.

FIG. 18A is a perspective view of a watch-type portable information terminal (also called a smartwatch (registered trademark)) 700. The portable information terminal 700 includes a housing 701, a display panel 702, a clasp 703, bands 705A and 705B, and operation buttons 711 and 712.

An active matrix display device may be provided as the display panel, for example. Examples of the active matrix display device include a reflective liquid crystal display device, an organic EL display device, and electronic paper. An image (a moving image or a still image) or the time can be displayed on the active matrix display device. Electric power for the active matrix display device can be supplied from a thin-film-type secondary battery. An organic EL display device with a flexible substrate may also be used.

The display device includes a display panel and a driver circuit for supplying an image signal to the display panel. The driver circuit can include a plurality of OS transistors described in the above embodiment, for example. In the power storage device of one embodiment of the present invention, the secondary battery and the OS transistors can be provided over the same substrate. In this manner, providing the driver circuit including the OS transistors enables the secondary battery and the driver circuit or at least part of the driver circuit to be provided over the same substrate. Thus, a thinner, lighter, and more robust portable information terminal of one embodiment of the present invention becomes possible, for example.

The display panel 702 mounted in the housing 701 doubling as a bezel includes a rectangular display region. The display region has a curved surface. The display panel 702 preferably has flexibility. Note that the display region may be non-rectangular.

The band 705A and the band 705B are connected to the housing 701. The clasp 703 is connected to the band 705A. The band 705A and the housing 701 are connected such that a connection portion rotates via a pin, for example. The same applies to the connection between the band 705B and the housing 701 and between the band 705A and the clasp 703.

Figure 18B:
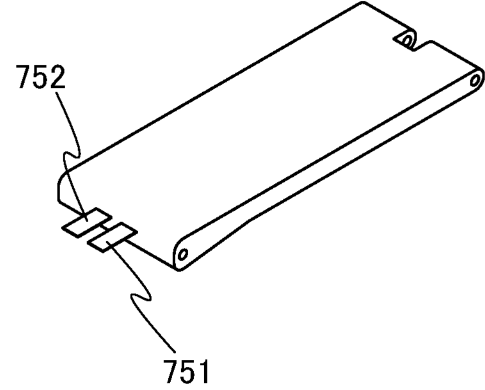
FIG. 18B is a diagram illustrating an example of an electronic device.

FIG. 18B is a perspective view of the band 705A. The band 705A includes a power storage device. As the power storage device, the power storage device described in the foregoing embodiment can be used, for example. The power storage device is embedded in the band 705A, and a positive electrode lead 751 and a negative electrode lead 752 of a secondary battery included in the power storage device partly protrude from the band 705A (see FIG. 18B). The positive electrode lead 751 and the negative electrode lead 752 are electrically connected to the display panel 702. Note that the pin may have a function of an electrode. Specifically, through the pin that connects the band 705A and the housing 701, the positive electrode lead 751 and the display panel 702 may be electrically connected to each other and the negative electrode lead 752 and the display panel 702 may be electrically connected to each other. This simplifies the structure of the connection portion between the band 705A and the housing 701.

The power storage device has flexibility. Thus, the band 705A can be formed so as to incorporate the power storage device. For example, the power storage device is set in a mold that matches the outer shape of the band 705A, and a material of the band 705A is poured in the mold and cured, so that the band 705A illustrated in FIG. 18B can be formed.

In the case where a rubber material is used as the material for the band 705A, rubber is cured through heat treatment. For example, in the case where fluorine rubber is used as a rubber material, it is cured through heat treatment at 170° C. for 10 minutes. In the case where silicone rubber is used as a rubber material, it is cured through heat treatment at 150° C. for 10 minutes.

Examples of the material for the band 705A include fluorine rubber, silicone rubber, fluorosilicone rubber, and urethane rubber.

The portable information terminal 700 illustrated in FIG. 18A can have a variety of functions. The portable information terminal 700 can have, for example, a function of displaying a variety of information (e.g., a still image, a moving image, and a text image) on the display region, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data written in a recording medium and displaying it on the display region.

The housing 701 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the portable information terminal 700 can be manufactured using a light-emitting element in the display panel 702.

Although FIG. 18A illustrates the example where the power storage device is incorporated in the band 705A, the power storage device may be incorporated in the band 705B. The band 705B can be formed using a material similar to that for the band 705A.

FIG. 19A illustrates an example of a cleaning robot. A cleaning robot 6300 includes a display portion 6302 placed on the top surface of a housing 6301, a plurality of cameras 6303 placed on the side surface of the housing 6301, a brush 6304, operation buttons 6305, a variety of sensors, and the like. Although not illustrated, the cleaning robot 6300 is provided with a tire, an inlet, and the like. The cleaning robot 6300 can run autonomously, detect dust 6310, and vacuum the dust through the inlet provided on a bottom surface.

For example, the cleaning robot 6300 can analyze images taken by the cameras 6303 to judge whether there are obstacles such as a wall, furniture, or a step. When an object that is likely to be caught in the brush 6304, such as a wire, is detected by image analysis, the rotation of the brush 6304 can be stopped. The cleaning robot 6300 internally includes the power storage device of one embodiment of the present invention and a semiconductor device or an electronic component. The cleaning robot 6300 including the power storage device of one embodiment of the present invention can be a highly reliable electronic device that can operate for a long time.

FIG. 19B illustrates an example of a robot. A robot 6400 illustrated in FIG. 19B includes a power storage device 6409, an illuminance sensor 6401, a microphone 6402, an upper camera 6403, a speaker 6404, a display portion 6405, a lower camera 6406, an obstacle sensor 6407, a moving mechanism 6408, an arithmetic device, and the like.

The microphone 6402 has a function of detecting a speaking voice of a user, an environmental sound, and the like. The speaker 6404 has a function of outputting sound. The robot 6400 can communicate with a user with the use of the microphone 6402 and the speaker 6404.

The display portion 6405 has a function of displaying various kinds of information. The robot 6400 can display information desired by a user on the display portion 6405. A touch panel may be incorporated in the display portion 6405. Moreover, the display portion 6405 may be a detachable information terminal, in which case charging and data communication can be performed when the display portion 6405 is set at the home position of the robot 6400.

The upper camera 6403 and the lower camera 6406 each have a function of taking images of the surroundings of the robot 6400. The obstacle sensor 6407 can detect an obstacle in the direction where the robot 6400 advances with the moving mechanism 6408. The robot 6400 can move safely by recognizing the surroundings with the upper camera 6403, the lower camera 6406, and the obstacle sensor 6407.

The robot 6400 internally includes the power storage device 6409 of one embodiment of the present invention and a semiconductor device or an electronic component. The robot 6400 including the power storage device of one embodiment of the present invention can be a highly reliable electronic device that can operate for a long time.

FIG. 19C illustrates an example of a flying object. A flying object 6500 illustrated in FIG. 19C includes propellers 6501, a camera 6502, a power storage device 6503, and the like and has a function of flying autonomously.

For example, image data taken by the camera 6502 is stored in an electronic component 6504. The electronic component 6504 can analyze the image data to detect whether there are obstacles when the flying object moves. Moreover, the power storage device 6503 can estimate the remaining battery level from a change in the power storage capacity of the secondary battery. The flying object 6500 internally includes the power storage device 6503 of one embodiment of the present invention. The flying object 6500 including the power storage device of one embodiment of the present invention can be a highly reliable electronic device that can operate for a long time.

FIG. 19D illustrates an example of an automobile. An automobile 7160 includes a power storage device 7161, an engine, tires, a brake, a steering gear, a camera, and the like. The automobile 7160 internally includes the power storage device 7161 of one embodiment of the present invention. The automobile 7160 with the power storage device of one embodiment of the present invention can be lightweight. In addition, the volume of the secondary battery occupying the vehicle can be smaller. Furthermore, the automobile 7160 can have a longer driving distance, a higher level of safety, and higher reliability.

This embodiment can be implemented in appropriate combination with the other embodiments.

REFERENCE NUMERALS

11: transistor, 12: transistor, 13: transistor, 14: transistor, 15: transistor, 21: transistor, 22: transistor, 23: transistor, 24: transistor, 25: transistor, 50: comparator, 90: power storage device, 91: battery control circuit, 91*a*: circuit, 91*b*: circuit, 99: retention circuit, 99*a*: transistor, 99*b*: transistor, 100: positive electrode, 101: positive electrode active material layer, 103: positive electrode current collector, 110: substrate, 113: comparator, 114: memory element, 120: assembled battery, 121: battery cell, 130: cell balancing circuit, 130*a*: cell balancing circuit, 131: resistor, 132: transistor, 140: transistor, 150: transistor, 161: capacitor, 162: transistor, 172: transistor, 182: logic circuit, 185: detection circuit, 185*a*: detection circuit, 185*c*: circuit, 185*d*: circuit, 186: detection circuit, 200: secondary battery, 203: solid electrolyte layer, 204: negative electrode active material layer, 205: negative electrode current collector, 206: protective layer, 210: negative electrode, 213: solid electrolyte layer, 215: positive electrode current collector, 300: transistor, 313: semiconductor region, 314*a*: low-resistance region, 314*b*: low-resistance region, 315: insulator, 316: conductor, 320: insulator, 322: insulator, 324: insulator, 326: insulator, 328: conductor, 330: conductor, 350: insulator, 400: glasses-type device, 400*a*: frame, 400*b*: display portion, 401: headset-type device, 401*a*: microphone portion, 401*b*: flexible pipe, 401*c*: earphone portion, 402: device, 402*a*: housing, 402*b*: power storage device, 403: device, 403*a*: housing, 403*b*: power storage device, 405: watch-type device, 405*a*: display portion, 405*b*: belt portion, 406: belt-type device, 406*a*: belt portion, 406*b*: wireless power feeding and receiving portion, 500: transistor, 503: conductor, 512: insulator, 514: insulator, 520: insulator, 522: insulator, 524: insulator, 530: oxide, 530*a*: oxide, 530*b*: oxide, 530*c*: oxide, 540*a*: conductor, 540*b*: conductor, 542*a*: conductor, 542*b*: conductor, 543*a*: region, 543*b*: region, 544: insulator, 550: insulator, 560: conductor, 560*a*: conductor, 560*b*: conductor, 574: insulator, 580: insulator, 580*b*: insulator, 581: insulator, 599: substrate, 600: capacitor, 610: conductor, 610*b*: conductor, 611: insulator, 660: sensor element, 660*a*: conductor, 660*b*: layer, 660*c*: conductor, 700: portable information terminal, 701: housing, 702: display panel, 703: clasp, 705A: band, 705B: band, 711: operation button, 712: operation button, 751: positive electrode lead, 752: negative electrode lead, 913: power storage device, 3000: IC card, 3001: thin-film-type secondary battery, 3002: ID, 3003: photograph, 3004: IC, 3005: radio wave, 6300: cleaning robot, 6301: housing, 6302: display portion, 6303: camera, 6304: brush, 6305: operation button, 6310: dust, 6400: robot, 6401: illuminance sensor, 6402: microphone, 6403: upper camera, 6404: speaker, 6405: display portion, 6406: lower camera, 6407: obstacle sensor, 6408: moving mechanism, 6409: power storage device, 6500: flying object, 6501: propeller, 6502: camera, 6503: power storage device, 6504: electronic component, 7160: automobile, 7161: power storage device

The invention claimed is:

1. A power storage device comprising a first substrate, a first battery cell, a comparison circuit, and a control circuit, wherein the comparison circuit comprises a first input terminal, a second input terminal, an output terminal, and a first transistor, wherein the first transistor comprises an oxide semiconductor over the first substrate, a first insulator over the oxide semiconductor, and a gate electrode over the first insulator, wherein a second insulator is provided over the gate electrode of the first transistor, wherein the first battery cell comprises a first electrode over the second insulator, a positive electrode active material layer over the first electrode, an electrolyte layer over the positive electrode active material layer, a negative electrode active material layer over the electrolyte layer, and a second electrode over the negative electrode active material layer, wherein the first electrode is electrically connected to the gate electrode of the first transistor and the first input terminal, wherein a third electrode is provided over the second insulator and electrically connected to one of a source electrode and a drain electrode of the first transistor, wherein the first electrode and the third electrode comprise a same material, wherein the comparison circuit is configured to output a first signal in response to a result of comparison between a potential of the first electrode and a desired reference potential from the output terminal to the control circuit, and wherein the control circuit is configured to control charging of the first battery cell in accordance with the first signal.

2. The power storage device according to claim 1, further comprising a second transistor and a capacitor, wherein one of a source electrode and a drain electrode of the second transistor is electrically connected to the second input terminal and one electrode of the capacitor, and wherein the second transistor comprises an oxide semiconductor.

3. The power storage device according to claim 1, wherein the output terminal is electrically connected to the one of the source electrode and the drain electrode of the first transistor.

4. The power storage device according to claim 1, further comprising a second transistor comprising an oxide semiconductor, a third transistor comprising an oxide semiconductor, and a capacitor, wherein one of a source electrode and a drain electrode of the second transistor is electrically connected to the second input terminal, a gate electrode of the third transistor, and one electrode of the capacitor, and wherein the output terminal is electrically connected to one of a source electrode and a drain electrode of the third transistor.

5. The power storage device according to claim 1, wherein the first electrode and the third electrode each comprise a titanium compound.

6. The power storage device according to claim 1, wherein the first electrode, the source electrode of the first transistor, and the drain electrode of the first transistor each comprise a titanium compound.

7. The power storage device according to claim 1, wherein the first electrode and the gate electrode of the first transistor each comprise a titanium compound.

8. The power storage device according to claim 1, further comprising a second battery cell, a converter circuit, a clock generation circuit, a booster circuit, and a voltage retention circuit, wherein the first transistor comprises a back gate electrode, wherein the converter circuit is configured to convert a positive electrode potential of the second battery cell and supply the potential as a second signal to the clock generation circuit, wherein the clock generation circuit is configured to generate a third signal as a clock signal, with use of the second signal, wherein the booster circuit is configured to generate a first potential with use of the third signal, and wherein the voltage retention circuit is configured to supply the first potential to the back gate electrode to be retained.

9. The power storage device according to claim 1, wherein the first substrate is any of a glass substrate, a quartz substrate, a sapphire substrate, a ceramic substrate, a metal substrate, a semiconductor substrate, an SOI substrate, and a plastic substrate.

10. The power storage device according to claim 1, wherein the first substrate is a semiconductor substrate, wherein the first substrate comprises silicon, and wherein a transistor with a channel formation region in the first substrate is included.

11. A power storage device comprising:

a first substrate;

a first transistor comprising an oxide semiconductor over the first substrate, a first insulator over the oxide semiconductor, and a gate electrode over the first insulator;

a second insulator over the oxide semiconductor;

a first battery cell comprising a first electrode over the second insulator, a positive electrode active material layer over the first electrode, an electrolyte layer over the positive electrode active material layer, a negative electrode active material layer over the electrolyte layer, and a second electrode over the negative electrode active material layer;

a third electrode over the second insulator; and a fourth electrode overlapping the third electrode with a third insulator provided therebetween, wherein the first electrode and the fourth electrode comprise a same material, and wherein the third electrode is electrically connected to one of a source electrode and a drain electrode of the first transistor.

12. The power storage device according to claim 11, wherein the first electrode and the third electrode comprise a titanium compound.

13. The power storage device according to claim 11, wherein the first transistor comprises the oxide semiconductor in a channel formation region.

14. The power storage device according to claim 11, wherein the first electrode and the fourth electrode each comprise a titanium compound.

15. The power storage device according to claim 11, further comprising:

a fifth electrode over the second insulator; and a piezoelectric layer overlapping with the fifth electrode, wherein the first electrode and the fifth electrode each comprise a titanium compound.

16. An electronic device comprising a display portion, a driver circuit, and the power storage device according to claim 1, wherein the driver circuit is configured to supply an image signal to the display portion, and wherein the driver circuit comprises a plurality of transistors comprising an oxide semiconductor.

* * * * *